United States Patent
Bapst et al.

(10) Patent No.: US 9,749,400 B2
(45) Date of Patent: *Aug. 29, 2017

(54) COOPERATIVE LOADING OF WEBPAGES BASED ON SHARED META INFORMATION

(71) Applicant: QUALCOMM Incorporated, San Diego, CA (US)

(72) Inventors: Mark Bapst, South Barrington, IL (US); Bojin Liu, San Diego, CA (US); Vijayakumar Rajiv, San Diego, CA (US); Gurevich Nela, Yoqneam Illit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,827

(22) Filed: Mar. 22, 2016

(65) Prior Publication Data

US 2016/0205177 A1 Jul. 14, 2016

Related U.S. Application Data

(63) Continuation of application No. 13/468,016, filed on May 9, 2012, now Pat. No. 9,325,806.

(Continued)

(51) Int. Cl.
*H04L 29/06* (2006.01)
*H04L 29/08* (2006.01)
*G06F 17/30* (2006.01)

(52) U.S. Cl.
CPC ........ *H04L 67/10* (2013.01); *G06F 17/30902* (2013.01); *H04L 67/42* (2013.01)

(58) Field of Classification Search
None
See application file for complete search history.

(56) References Cited

U.S. PATENT DOCUMENTS 6,549,896 B1 4/2003 Candan et al.
8,073,866 B2 12/2011 Eagle et al.
(Continued)

FOREIGN PATENT DOCUMENTS

CN 101930459 A 12/2010
CN 102314486 A 1/2012
(Continued)

OTHER PUBLICATIONS

International Preliminary Report on Patentability—PCT/US2013/026865, The International Bureau of WIPO—Geneva, Switzerland, Jul. 10, 2014.

(Continued)

*Primary Examiner* — Henry Tsang
(74) *Attorney, Agent, or Firm* — Nicholas A. Cole

(57) ABSTRACT

A system, methods and server for creating and using manifests to support the rendering of a webpage by a computing device. Multiple computing devices may render a webpage and generate meta data. A server may collect and use the meta data to generate a manifest. The manifest may provide information describing priorities and formats for loading the resources of the webpage. The computing device may transmit information to the server for comparison with the manifest and to determine priorities and formats for retrieving the resources of the webpage. The server may request and send the webpage resources to the computing device based on the manifest information, to which the computing device may render the webpage. The server may access the webpage and generate meta data to create the manifest. The server may alternatively send the manifest information to the computing device.

64 Claims, 20 Drawing Sheets

Related U.S. Application Data

(60) Provisional application No. 61/602,777, filed on Feb. 24, 2012, provisional application No. 61/621,629, filed on Apr. 9, 2012.

(56) References Cited

U.S. PATENT DOCUMENTS

| | | |
|---|---|---|
| 9,325,806 B2 | 4/2016 | Bapst et al. |
| 2002/0152239 A1* | 10/2002 | Bautista-Lloyd ............ G06F 17/30899 715/234 |
| 2003/0187806 A1 | 10/2003 | Banerjee et al. |
| 2004/0167933 A1* | 8/2004 | Lomelin-Stoupignan ............ G06F 17/30867 |
| 2006/0294223 A1* | 12/2006 | Glasgow ............ H04L 67/2847 709/224 |
| 2008/0222273 A1* | 9/2008 | Lakshmanan ..... G06F 17/30247 709/219 |
| 2009/0234811 A1 | 9/2009 | Jamil et al. |
| 2009/0249188 A1 | 10/2009 | Dube et al. |
| 2010/0023953 A1 | 1/2010 | Lee et al. |
| 2010/0115060 A1 | 5/2010 | Julia et al. |
| 2010/0228880 A1 | 9/2010 | Hunt et al. |
| 2010/0332513 A1* | 12/2010 | Azar ................. G06F 17/30469 707/769 |
| 2011/0072106 A1 | 3/2011 | Hoffert et al. |
| 2011/0302233 A1* | 12/2011 | Ramadas .......... G06F 17/30902 709/202 |
| 2012/0030560 A1 | 2/2012 | Yano |
| 2012/0144288 A1* | 6/2012 | Caruso ............. G06F 17/30905 715/234 |

FOREIGN PATENT DOCUMENTS

| | | |
|---|---|---|
| JP | 2001154983 A | 6/2001 |
| JP | 2003162474 A | 6/2003 |
| JP | 2009277182 A | 11/2009 |
| JP | 2012032943 A | 2/2012 |

OTHER PUBLICATIONS

International Search Report and Written Opinion—PCT/US2013/026865—ISA/EPO—Jul. 9, 2013.

Kambalakatta, R., et al., "Profile based caching to enhance data availability in push/pull mobile environments", Mobile and Ubiquitous Systems: Networking and Services, 2004. ,MOBIQUIT OUS 2004. The First Annual International Conference on Boston, MA, USA Aug. 22-26, 2004, Piscataway, NJ, USA, IEEE, Aug. 22, 2004, (Aug. 22, 2004), pp. 74-83, XP010721020, DOI: 10.1109/MOBIQ.2004.1331712 ISBN: 978-0-7695-2208-1 abstract p. 1, left-hand column, paragraph 1-p. 7, left-hand column, last paragraph.

* cited by examiner

US 9,749,400 B2

COOPERATIVE LOADING OF WEBPAGES BASED ON SHARED META INFORMATION

RELATED APPLICATIONS

This application claims the benefit of priority to U.S. patent application Ser. No. 13/468,016 entitled "Cooperative Loading of Webpages Based on Shared Meta Information" filed May 9, 2012, which claims the benefit of priority to U.S. Provisional Patent Application No. 61/602,777 entitled "Cooperative Loading of Webpages Based on Crowd Sourced Meta Information" filed Feb. 24, 2012 and to U.S. Provisional Patent Application No. 61/621,629 entitled "Cooperative Loading of Webpages Based on Crowd Sourced Meta Information" filed Apr. 9, 2012, the entire content of all applications is hereby incorporated by reference.

BACKGROUND

Cellular and wireless communication technologies have seen explosive growth over the past several years. This growth has been fueled by better communications hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, smart phones, tablets, laptops, etc.) have become faster and more powerful than ever. However, despite these improvements, mobile devices may still appear sluggish at times.

Mobile device hardware (e.g., processors and wireless modems) used in modern mobile electronics now have impressive capacities. However, web-based software applications (e.g., a web-browser) consume a significant portion of available communication bandwidth, causing the entire mobile device to appear sluggish. This is most evident when loading a webpage over a telecommunications network, such as 3G or 4G. These slow communications tie up device resources and negatively impact the user experience. Accordingly, improving the efficiency and speed of page-loads, web applications, and network communications are important design criteria for mobile device manufacturers.

SUMMARY

The various aspects include a method for supporting rendering of webpages by mobile computing devices based on a webpage manifest provided by a server. In an aspect, the method may include generating on multiple mobile computing devices meta information relating to processing webpages, transmitting to a server from each of the multiple mobile computing devices the generated meta information, and identifying a user agent used in processing each webpage, receiving the generated meta information in the server, generating a manifest for each webpage and each user agent based on the meta information received from the multiple mobile computing devices, using the manifest to assign priorities to resources required for loading the webpage with a user agent on a mobile computing device, receiving the resources on the mobile computing device in a sequence determined based on their assigned priorities, and rendering the webpage on the mobile computing device. In an aspect, the method may include the mobile computing device transmitting to the server meta information generated during rendering of the webpage. In a further aspect, the method may include transmitting information identifying the webpage and a user agent implemented on the mobile computing device to the server, obtaining the manifest for the webpage and the user agent implemented on the mobile computing device, transmitting the obtained manifest to the mobile computing device, identifying in the mobile computing device resources required for loading the webpage on the mobile computing device by comparing the manifest to information stored on the mobile computing device, and assigning priorities to the identified resources in the mobile computing device based on the manifest. In a further aspect, the method may include the mobile computing device requesting download of the resources from a second server in a sequence determined by the mobile computing device based on the manifest. In a further aspect, the method may include transmitting information relating to the mobile computing device to the server, obtaining the manifest for the webpage and the user agent implemented on the mobile computing device, comparing, in the server, the obtained manifest to the information relating to the mobile computing device, identifying, in the server, priorities and appropriate object formats for resources required for loading the webpage on the mobile computing device, and transmitting to the mobile computing device the identified priorities and appropriate object formats for resources required for loading the webpage on the mobile computing device. In a further aspect, the method may include the server pushing the resources to the mobile computing device in a sequence determined by the server based on the manifest. In a further aspect, the method may include the server transcoding resources to a desired format for the mobile computing device.

In further aspect, a method for supporting rendering of webpages by mobile computing devices may include generating on a server meta information relating to processing the webpage using various types of user agents, generating a manifest for the webpage for each type of user agent based on the generated meta information, using the manifest to assign priorities to resources required for loading the webpage with a user agent on a mobile computing device, receiving the resources on the mobile computing device in a sequence determined based on their assigned priorities, and rendering the webpage on the mobile computing device. In a further aspect, the method may include the mobile computing device transmitting to the server meta information generated during rendering of the webpage. In a further aspect, the method may include transmitting the manifest to the mobile computing device for evaluation with information relating to the mobile computing device, identifying in the mobile computing device the resources required for loading the webpage on the mobile computing device, and assigning priorities to the identified resources in the mobile computing device. In a further aspect, the method may include the mobile computing device requesting download of the resources from a second server in a sequence determined by the mobile computing device based on the manifest. In a further aspect, the method may include transmitting information relating to the mobile computing device to the server, obtaining the manifest for the webpage and the user agent implemented on the mobile computing device, comparing, in the server, the obtained manifest to the information relating to the mobile computing device, identifying, in the server, priorities and appropriate object formats for resources required for loading the webpage on the mobile computing device, and transmitting to the mobile computing device the identified priorities and appropriate object formats for resources required for loading the webpage on the mobile computing device. In a further aspect, the method may include the server pushing the resources to the mobile computing device in a sequence determined by the server based on the manifest. In a further aspect, the method may include the server transcoding resources to a desired format for the mobile computing device.

The various aspects may include a mobile computing device having a memory and a processor coupled to the memory, in which the processor is configured with processor-executable instructions to perform operations including transmitting information identifying a webpage and a user agent implemented on the mobile computing device to a server, receiving a manifest from the server for the webpage and the user agent implemented on the mobile computing device, identifying resources required for loading the webpage by comparing the manifest to information stored on the mobile computing device, assigning priorities to the identified resources based on the manifest, receiving the resources in a sequence determined based on their assigned priorities, and rendering the webpage. In a further aspect, the mobile computing device processor may be configured with processor-executable instructions to request downloads of the resources from a second server in a sequence based on the manifest and/or transmitting to the server meta information generated during rendering of the webpage.

The various aspects may include a mobile computing device including means for accomplishing functions of the methods described above accomplished in the mobile computing device. The various aspects may also include a non-transitory processor-readable storage medium having stored thereon processor-executable software instructions configured to cause a processor to perform operations of the methods described above accomplished in the mobile computing device.

The various aspects may include a server a memory a server processor coupled to the memory, in which the processor is configured with server processor-executable instructions to perform operations including collecting meta information relating to processing a webpage using various types of user agents, generating a manifest for the webpage for each type of user agent based on the collected meta information, using the manifest to assign priorities to resources required for loading the webpage with a user agent on a mobile computing device, and transmitting the resources to the mobile computing device in a sequence determined based on their assigned priorities. In a further aspect, the server processor may be configured with server processor-executable instructions to perform operations including transmitting the manifest to the mobile computing device for evaluation with information relating to the mobile computing device. In a further aspect, the server processor may be configured with server processor-executable instructions to perform operations including receiving meta information from the mobile computing device generated during rendering of the webpage. In a further aspect, the server processor may be configured with server processor-executable instructions to perform operations including generating meta information relating to processing the webpage using various types of user agents on the server. In a further aspect, the server processor may be configured with server processor-executable instructions to perform operations including receiving meta information relating to processing the webpage using various types of user agents from a plurality of mobile computing devices. In a further aspect, the server processor may be configured with server processor-executable instructions to perform operations including receiving information relating to the mobile computing device, evaluating the received information using the manifest, identifying priorities and appropriate object formats for the resources required for loading the webpage on the mobile computing device, and transmitting to the mobile computing device the identified priorities and appropriate object formats for resources required for loading the webpage on the mobile computing device. In a further aspect, the server processor may be configured with server processor-executable instructions to perform operations including pushing the resources to the mobile computing device in a sequence based on the manifest. In a further aspect, the server processor may be configured with server processor-executable instructions to perform operations including transcoding resources to a desired format for the mobile computing device.

The various aspects may include a server including means for accomplishing functions of the methods described above accomplished in the server. The various aspects may include a non-transitory server-readable storage medium having stored thereon server processor-executable instructions configured to cause a server processor to perform operations of the methods described above accomplished in the server.

The various aspects may also include a communication system which may include a server configured to perform operations of the methods described above accomplished in a server, and a plurality of mobile computing devices configured to perform operations of the methods described above accomplished in mobile computing devices.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
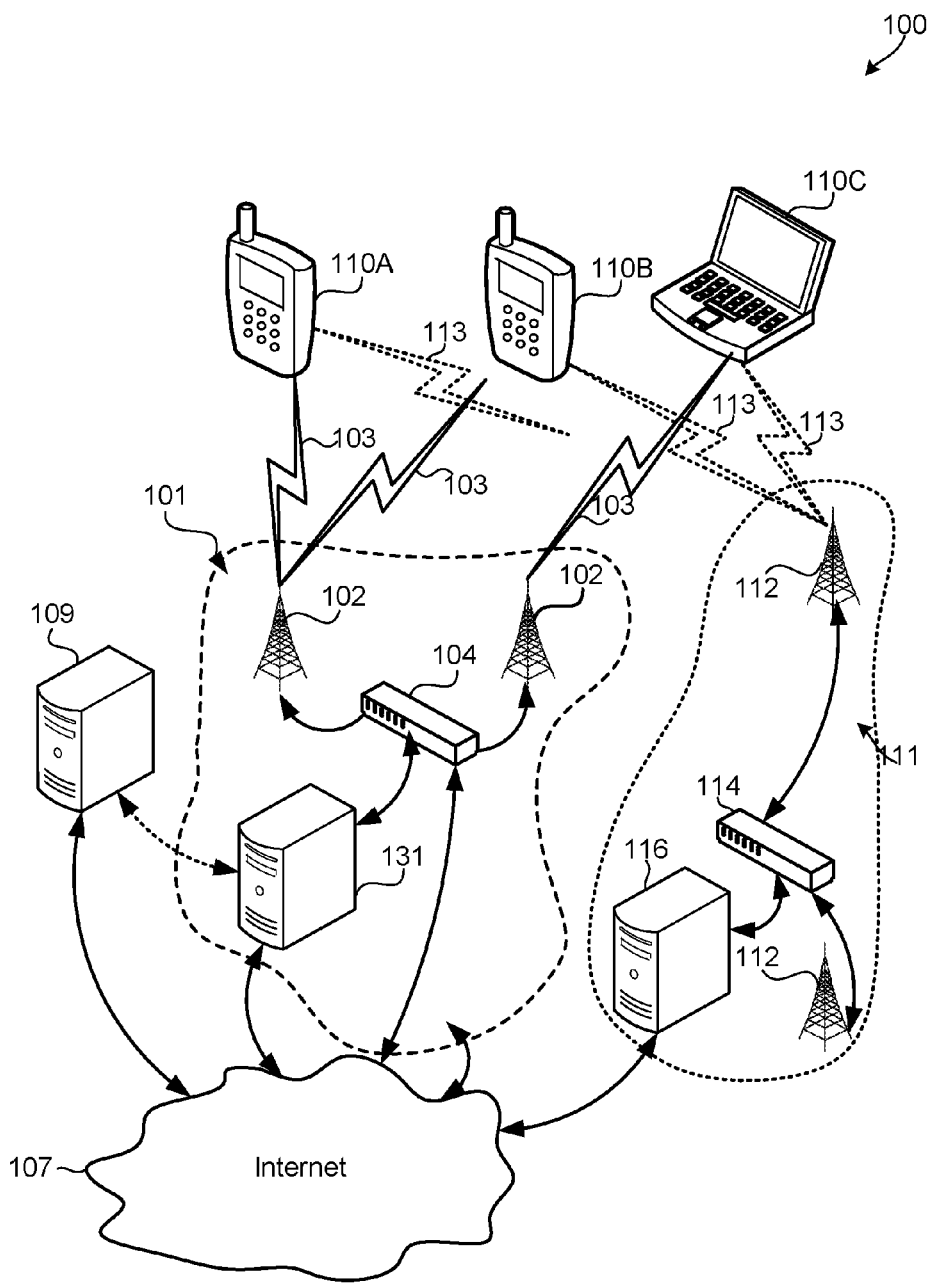
FIG. 1 is a communication system block diagram illustrating a mobile multimedia communication system suitable for use in various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as advantageous over other implementations.

As used herein, the terms "computing device," "mobile computing device," "mobile device," and "handheld device" refer to any one or all of cellular telephones, personal data assistants (PDA's), palm-top computers, wireless electronic mail receivers, smartphones, Global Positioning System (GPS) receivers, wireless gaming controllers, tablet computers, notebook computers, netbook computers, wireless email devices, smart televisions, smart automotive consoles, and similar electronic devices that include a programmable processor and memory, and are configured with a web browser application to communicate with a communication network.

As used herein, the terms "computer," "personal computer" and "computing device" refer to any programmable computer system that is known or that will be developed in the future. In an aspect, a computer will be coupled to a network such as described herein. A computer system may be configured with software instructions to perform the processes and operations described herein.

As used herein, the terms "component," "module," "platform," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers.

The various aspects provide improved web browsing methods that decrease the amount of time between a user request action and the rendering of content on a mobile computing device, referred to herein as a client. The various aspects may improve network efficiency, client power efficiency, and page load speeds without altering or limiting webpage functionality. Some aspects may enable both clients and servers to collect and exchange meta information, which may be used to employ crowd-sourcing and/or server hinting (both forms of distributed computing) techniques that allow one client to improve communication speeds of other clients (e.g., through server coordination) on the network. In other aspects, servers may collect meta information by independently and periodically accessing webpages (i.e., "server-sourcing"), and provide information to clients to improve network communication performance.

Loading webpages over 3G/4G networks is typically slower than over wired and local area networks. This is due in part to long round trip times (e.g., RTT of 200 ms up to 500 ms), iterative discovery of resources on a particular webpage, resource dependencies, limited, and asymmetric bandwidth, Uplinks (ULs) being more constrained than Downlinks (DLs), and varying network conditions, which may be due to changes in signal strength, interferences, and other related factors.

Generally, browser behavior during page load involves the repeated performance of a limited set of operations. Such repetitive operations may include: downloading content and code, compiling the code, fetching, and executing objects, and iteratively discovering new objects for execution. These operations are inefficient, and repeatedly performing these operations on a slow telecommunications network can cause long end-to-end page load times, degrading the user experience.

Fetching objects one by one from the server using HTTP is inefficient, particularly over 3G/4G networks with high RTTs. Fetching each object may require a round trip communication lag, and downloading all the objects within a webpage may involve multiple round trips. In addition, there may be dependencies between requests, and not all object requests can be sent out at the same time. Further, processing certain objects may generate new objects that were not part of the original HTML page (e.g. External Javascripts), and the browser may be forced to download additional objects, further contributing to long page load times and/or round trip times. Operations such as domain name service (DNS) resolution and uniform resource locator (URL) redirection can add overhead delays that further contribute to long page load times and/or round trip times. Existing solutions for improving page load speeds and browser performance fail to address these factors, or are inefficient, ineffective, and/or otherwise unsatisfactory. The various aspects eliminate or reduce the impact of the above mentioned factors, thereby improving network efficiency and page load speeds.

Existing solutions either rely entirely on the server to make all the decisions of how to assist the client in rendering a webpage or use some form of client based caching (e.g., disk caching). While disk caches may help reduce the total number of requests, not all objects are guaranteed to be in cache or even cacheable. To improve performance from the server side, a website may employ server-push technology for resource delivery. However, performing a server push without the knowledge of client or network state does not result in optimal performance, since it may push objects which the client already has stored in memory.

Certain web browsers (e.g., Opera® mini) may employ a server assisted approach for faster page downloads. However, these browsers require customized mark up languages to render the content on the client and changes to the webpage content, and, as a result, limit the webpage's functionality (e.g. limit dynamic Javascript®). Other browsers (e.g., Amazon® Silk) employ cloud resources for faster webpage processing. However, these browsers do not improve the network's efficiency and/or do not support cooperative client-server loading of webpages by using information collected from both the client and the server.

The various aspects overcome these and other limitations of existing solutions by providing a protocol for cooperative client-server loading of webpages based on shared meta information, which may be generated from information collected from the client and/or the server. The various aspects also take into consideration the network conditions, along with the information procured from both clients and servers, to reduce the overall page load times. The various aspects enable improving network efficiency, modem power efficiency, and page load speeds without altering or limiting webpage functionality. The various aspects leverage the network and mobile device knowledge of the client with the content and crowd awareness of the server to reduce overall webpage and web application load times.

As mentioned above, the default browser behavior during a page load operation involves the repeated performance of a limited set of operations which contribute to long end-to-end page load times, which may cause mobile devices to appear sluggish. After the page load operations are performed on a mobile device, the browser not only has access to information regarding objects that were fetched, but also has access to meta information that include type information, size information, styles, layouts (e.g., positions on screen for images), interdependencies, and other similar meta information. This information is useful for loading the same page a second time, either from the same device or from other devices. The various aspects enable sharing this information with other mobile devices to provide improved methods of downloading content and rendering a webpage, which take into consideration meta information collected from both the client and the server, as well as the network conditions.

In an aspect, after a mobile client (e.g., a mobile device web-browser) renders a webpage, it collects meta information regarding the webpage. This meta information may include the client's user agent (UA), lists of object uniform resource locators (URLs), object dependencies, object types, sizes, layout information, and other similar information. The client may submit the collected meta information to a server. The server may collect meta information from many different mobile devices and for multiple websites, and consolidate (e.g., crowd-source, server hint, etc.) the meta information into a manifest. The manifest may be an arrangement of any such meta information useful to a client in the process of rendering, accessing, or downloading a webpage. The manifest may be used by the server or multiple clients to recognize and prioritize the resources needed to efficiently display the webpage. In an aspect, the manifest for each webpage may contain different meta information based on the type or form of user agent (e.g., browser application, communications software) employed by the client computing device accessing the webpage. Alternatively, a different manifest may be generated for each type or form of user agent (i.e., user agent-specific manifests). The server may update and maintain a database of manifests regarding multiple webpages, clients, client types, servers, and networks, and the server may maintain numerous manifests for an individual webpage, such as when the server maintains user agent-specific manifests and/or the webpage includes different varieties (e.g., a variety for mobile devices). For example, the server may maintain a database which contains several distinct manifests for a single webpage that each contains different meta information based on user agent type. In an aspect, the server may use webpage identifying information (e.g., webpage URL) and/or user agent information to index manifests stored within the database.

In another aspect, the server may determine manifests for webpages independently from clients by directly receiving and evaluating the content of the respective webpages. In such aspects, the server may utilize proxy user agents running on the server, which access each webpage and perform the rendering processes in order to determine the meta information useful to each type of user agent as if the rendering had been accomplished on a client using that user agent.

In the various aspects, the server may periodically update manifests based on new meta information received from multiple clients (crowd-sourcing) or generated by the server itself (server-sourcing). Clients and/or the server may generate new meta information by accessing the webpages and re-evaluating the page load requirements, either as a whole new generation or through comparisons of the rendering experience with locally stored meta information, such as cached manifest data. In an aspect, updates to the manifest may be conducted by the server on a case-by-case basis depending on the frequency of updates and/or changes to the individual webpages. For example, the server may update the manifest for a search engine webpage once a day, and update the manifest for a real-time news site many times every hour, but update the manifest for a corporation or government entity once a week.

When a mobile client tries to access a webpage, the client may first check its local cache status, a server's cache status, network conditions, or any combination thereof. The network condition information may include information about the network, information collected from the network, and/or information that may be used to leverage current network conditions for a given request. The client and server may exchange cache information, network conditions, and meta information maintained by the server for the particular webpage being accessed. The client, the server, or both cooperatively may decide the optimal sequence in which the client should download information or in which the server should push the resources to the client. In an aspect, after the page load operations are complete, the mobile client may collect updated meta information generated from rendering the page, and send the updated information to the server for further crowd sourcing. The above mentioned process may be performed repeatedly, as needed, to continue to improve performance of the network. In another aspect, the client may transmit to the server meta information generated based on a webpage access even when an aspect enables server-sourcing. Thus, the server may have access to both crowd-sourced and server-sourced meta information when generating webpage manifests. This may enable the server to benefit from feedback by clients.

In this manner, the various aspects enable mobile clients and server to accelerate page downloads, and improve network efficiency by exchanging crowd sourced page meta information, as well as network status information. Various aspects may use both webpage content and multi-user knowledge accumulated by a server, in combination with the resource and network knowledge of the client, to determine a method of delivering content to a mobile device. In an aspect, instead of, or in addition to, clients sending metadata for crowd-sourcing, the server may compute metadata "on the fly" based on the content. As the source of the metadata changes, the server may continue to compute the metadata. These aspects avoid privacy concerns that may arise from collecting information from a particular client.

Various aspects enable the identification of the resources required for a given webpage, client or network prior to transmission. By identifying the required resources upfront, the server may push the required information to the client in response to an initial webpage access request, thereby reducing the long page load times and/or round trip times by nearly half.

The various aspects may be implemented within a variety of wireless or mobile communications systems, an example of which is illustrated in FIG. 1. The example communication system 100 illustrated in FIG. 1 includes a mobile broadcast network 101 and a unicast network 111, such as a cellular telephone network. A typical cellular telephone network includes a plurality of cellular base stations 112 coupled to a network operations center 114, which operates to connect voice and data calls between mobile computing devices, such as smart phones 110A, 110B and a laptop computer 110C, and other network destinations, such as via telephone land lines (e.g., a POTS network, not shown) and the Internet 107. In other aspects, mobile computing devices may also include devices such as mobile television receivers, cellular phones, personal digital assistants, interactive game devices, notebooks, smartbooks, ultrabooks, or other such electronic devices. Communications between mobile computing devices 110A-C and the unicast network 111 may be accomplished via two-way wireless communication links 113, such as 4G, 3G, CDMA, TDMA, and other cellular telephone communication technologies. To facilitate Internet data communications, the unicast network 111 will typically include one or more servers 116 coupled to or within the network operations center 114 that provide a connection to the Internet 107.

Mobile computing devices 110A-C may connect to the Internet 107 via a wired or WLAN (WiFi) connection when available, in which case the Internet 107 serves as the unicast network. Mobile computing devices 110A-C may receive content via the unicast network 111 using well known conventional Internet access protocols.

The communication system 100 may also include a mobile broadcast network 101, which typically includes a plurality of broadcast transmitters 102 controlled by a mobile broadcast network control center, referred to herein as a broadcast operation center 104 (or "BOC" in the figures). The broadcast network 101 broadcasts content from the broadcast transmitters 102 as mobile broadcast transmissions 103 for reception by mobile computing devices 110A-C. Within the mobile broadcast network control center 104 (also called the broadcast operation center or "BOC") will typically be one or more servers and systems for managing real time content broadcasts, generation of electronic service guides, and generation of meta information messages for broadcast via an overhead flow. The meta information may be sent in advance of content broadcasts, periodically, or in response to client requests. Broadcast meta information may be received and stored by mobile computing devices 110A-C, and used to improve future page load operations. For example, the meta information may be used by the mobile to selectively receive future broadcasts or to identify the resources that the mobile device browser is should request from a webpage.

In the various aspects, clients and servers may collect and exchange meta information. This meta information may include information that allows the mobile device or the server to better understand the client, server, network or website requirements, or any information that enables the mobile device browser to perform faster page load operations. In an aspect, the meta information may be XML, Ajax, or JSON code. The mobile device may review meta information as a manifest from the server when rendering the webpage. The manifest may provide a scheme for improved browser execution of webpages. The browser may use the manifest to more efficiently download and/or process a webpage, leading to faster execution times and lower power usage. For example, the manifest may provide information that certain data is frequently accessed or is popular among users. Data that ordinarily would be erased or that is used frequently may be uploaded from the mobile device to a cache memory located on a server.

In an aspect, the manifest may include JavaScript meta information. The manifest may provide useful information including JavaScript function probabilities of certain phrases, script tokens, lexing information, AST parsing information, already compiled binary data, just in time data, dependency trees, or other information to save time in processing JavaScript requests at the mobile device.

In an aspect, the manifest may include CSS meta information that includes information such as simplified or improved selectors, merging styles, or any other information to assist with processing, parsing, executing, or rendering CSS webpage data. In an aspect, the manifest may include information on how to process a DOM tree.

In an aspect, the manifest may include HTML meta information that instructs the mobile device on how to process encoded pages. In an aspect, the manifest may include data collected from other clients on the network, and may describe analytics or patterns received from observing other client's browsing information.

In an aspect, the manifest may include probabilities related to rendering, downloading, or processing parts of a webpage. For example, the manifest may indicate that a certain webpage element has a high probability of execution or may be very popular among those who access the page. A specific example might be that the user likes to click a "Sports" link on a particular news website. The mobile device may download those webpage elements based on speculation that the user may request the webpage element at some point in the future, or not at all. For example, the manifest may indicate that a library includes a first portion that has a high probability of execution, and that the first portion should be transmitted or accessed immediately. Likewise, the manifest may indicate that a second portion (having a lower probability of execution) need not be downloaded, or should be downloaded after the first portion.

The manifest may be pre-cached on the mobile device, such as may occur when the webpage is preloaded and provided to the browser in advance of a request to access a page. A manifest may be transmitted to subscribing mobile devices at a predetermined time period in advance of when the user might need the information, such as during evening or early morning hours when network usage is low. Alternatively, the manifest may be transmitted as part of a synchronization procedure, such as for a list of "top 100" websites or based on the usage habits of the client. In one aspect, a manifest may have a slower rate of change relative to web content, and thus may be pre-cached to the user's computer or mobile device at predetermined intervals. A typical example is style and layout of webpages, which tend to change very infrequently, even if the content on the page changes daily. In an aspect, the manifest may be supplied to the mobile device at a non-peak hour, such as late at night. In an aspect, the manifest may be supplied to the mobile device periodically, such as hourly, daily, weekly, monthly, or yearly. In an aspect, the manifest may be broadcast to mobile devices via a mobile broadcast network.

Generally, after page load operations are performed on a mobile device, the browser not only has generated information regarding objects that were fetched, but also to meta information regarding the information type, file size, styles, layouts (e.g., positions on screen for images), interdependencies, and other similar meta information related to rendering the page. This information may be useful for loading the same page a second time, either on the same device or on other mobile devices. Various aspects enable sharing this information to provide improved methods of downloading content and rendering a webpage, which may take into consideration meta information collected from both the client and the server, as well as the network conditions. In various aspects, the server may generate the manifest for a given webpage (i.e., as opposed to receiving it from a client), reducing the reliance on the clients and/or alleviating client privacy concerns. In an aspect, the server may be configured to generate the manifest when there is an extended absence of meta information from the clients. For example, if the server is configured to update or "freshen" a certain webpage every five minutes, the server may extract the meta information and generate the corresponding manifest for the page itself if it has not received such information from one or more clients in the past five minutes.

Various aspects may be implemented in a single proxy configuration (e.g., such that all client traffic goes through a central proxy server before it reaches the Internet 107) or in a configuration that utilizes a dedicated crowd source server (e.g., such that client traffic goes through the dedicated server, a web server, or a combination thereof, before it reaches the Internet 107). Aspects may also be implemented in a distributed system in which some or all webpage hosting servers receive and maintain the meta information relevant for their hosted pages.

Figure 2:
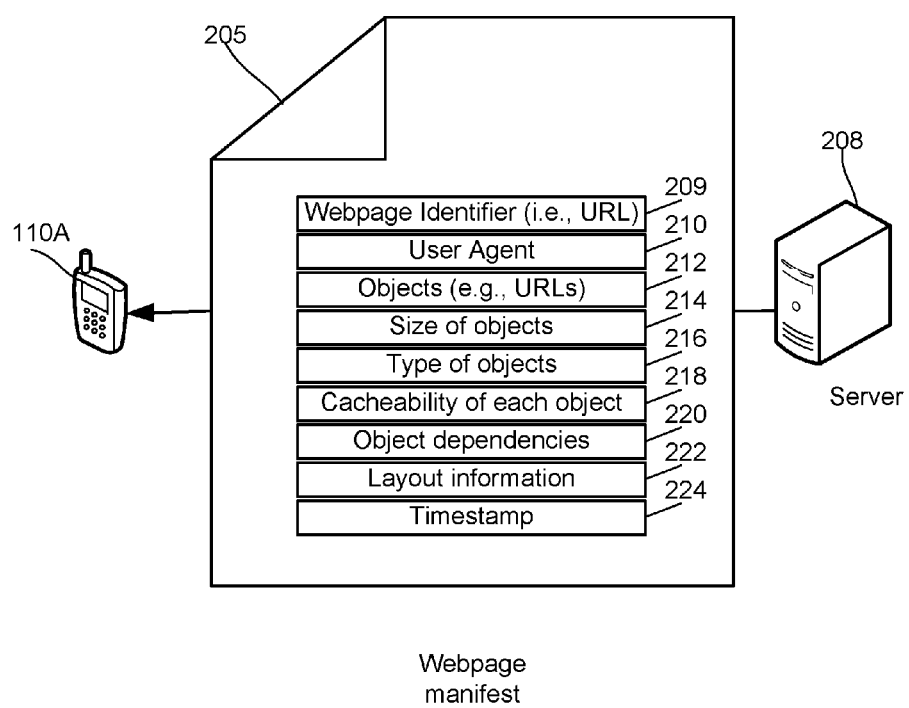
FIG. 2 is a structure diagram illustrating example structures of a manifest relating to a webpage according to an aspect.

FIG. 2 illustrates an example structure of a manifest 205 that may be implemented in an aspect. As mentioned above, a server 208 may generate a manifest 205 for a particular user agent and a particular webpage by evaluating meta information related to accessing and displaying a webpage. The server 208 may determine the meta information, such as described above in reference to FIG. 1, when independently retrieving the webpage's content. When a client mobile computing device, or client, 110A begins the process of downloading or otherwise accessing a webpage, the client may request the manifest 205 from the server 208. The server 208 may transmit the manifest 205, which may contain a collection of meta information, such as unique information of the webpage identity 209 (e.g., the URL for the webpage), user agent information 210 (e.g., an identifier or details regarding the software or other processing platform of the client 110A for which the manifest is prepared), a timestamp for the webpage 224, as well as descriptions of the objects or resources (e.g., image, HTML, or scripting files) associated with the webpage. The manifest may also include particular data about the objects themselves, such as object URLs 212 (e.g., file storage locations within a web server), object sizes 214, object types 216, the cache-ability of the objects 218 (e.g., whether particular objects may be stored within the cache of a client 110A for repeated use), dependencies between objects of the webpage 220, and layout information 222 (e.g., the relative position of an image within the webpage). The client 110A may receive the manifest and compare the manifest information to information stored within the client's computing device (e.g., cached data, network status, and other "local" information) to determine the priority of resources needed for future resource requests from web servers maintaining the webpage. In another aspect, the comparison of the manifest information to information regarding the client 110A may be accomplished by the server 208. In an aspect, when the client 110A requests the webpage, the server 208 may cross-reference the webpage identity 209 of the webpage requested (e.g., the webpage URL) with the user agent information 210 (e.g., user agent type) of the client 110A to determine the appropriate manifest 205 to transmit to the client 110A.

Figure 3:
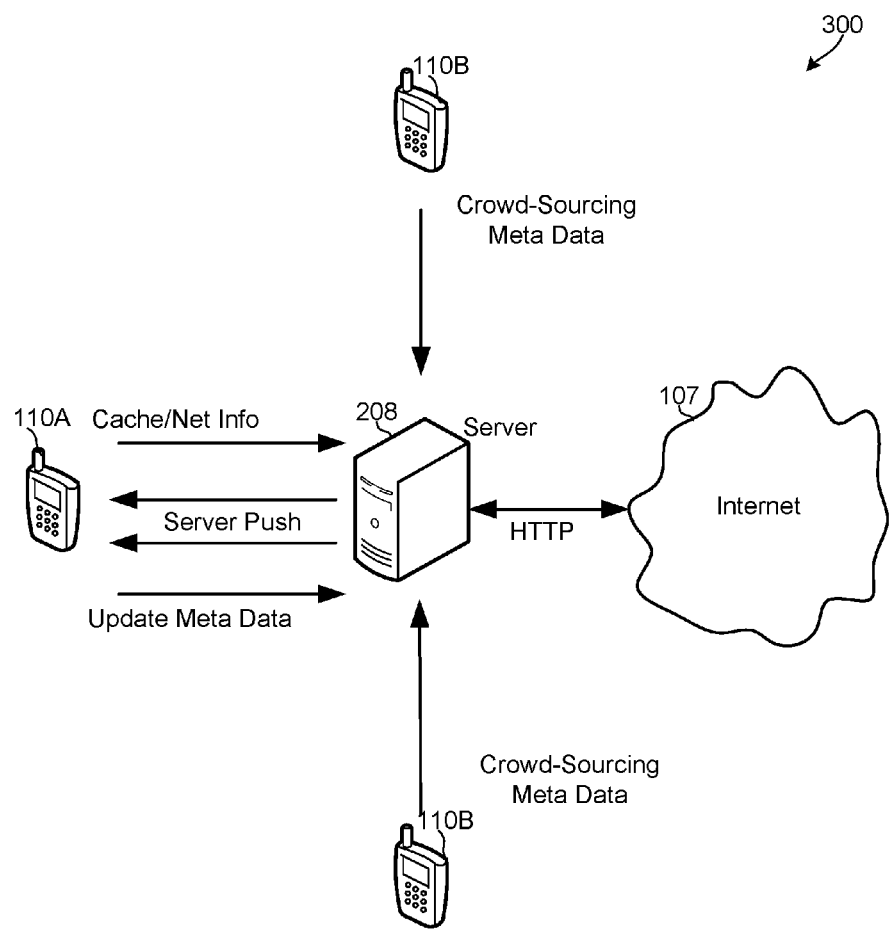
FIG. 3 is a network diagram illustrating example information flows in a single proxy configuration in accordance with an aspect.

FIG. 3 is a network diagram that illustrates example information flows in a single proxy configuration 300 in accordance with various aspects. In the illustrated single proxy configuration 300, all client traffic may go through a central proxy or edge server 208 (e.g., web proxy server, ISP gateway, or a CDN server, etc.) before it reaches the Internet 107. The central proxy server 208 may include a crowd-source server that collects meta information from many mobile clients, processes the collected meta information into a crowd source meta information product, or manifest, and distributes the manifest to mobile clients. Alternatively, the central proxy server 208 may produce the same meta information database without crowd sourcing, such as by directly processing the webpages to extract the appropriate data, as described below in respect to FIG. 5A.

Mobile computing devices 110B may send meta information about a webpage to the central proxy server 208. This information may include a local cache status, a current network condition, context information, user profile information, communication information, network information, mobile device information, web browser information, and/or any other information available to client that may be used by the server to improve page load speeds. The central proxy server 208 may receive the information and combine (e.g., crowd source, etc.) the information with meta information received from other mobile computing devices 110B and/or for different webpages. For example, different meta information may be necessary for any given webpage based on different client user agents (e.g. desktop, iOS®, Android®). The central proxy server 208 may also cache resources according to the crowd sourced meta information.

Another mobile computing device, or client, 110A may be configured such that, when directed to load a page, it first sends its local cache status and current network condition to the central proxy server 208 before loading the page. The client 110A may also send to the server 208 information regarding a particular client, mobile device type or network, and/or may request such information from the server 208. Based on meta information obtained from both the mobile computing devices 110B and the proxy server 208, the client 110A, and server 208 may cooperatively decide what resources should be downloaded/pushed (with different priority orders) to the client 110A. As part of this cooperative decision making, the system may select and/or prioritize resources that improve the usage of the wireless data link and/or reduce total page load time.

The selected resources (and/or related information) may be retrieved and pushed to the client 110A. The client 110A may receive the resources/information, and render the page (e.g., perform page load operations). The client 110A may then send updated meta information about the webpage to the proxy server 208, and the above mentioned process may be repeated.

In an aspect, the client's 110A traffic pattern may be evaluated to improve page rendering times on other clients. In an aspect, a cloud service distributed network may be used to improve page load speeds by anticipating the browser's operations (e.g., by providing meta information to the mobile device). In an aspect, a mobile computing device may identify frequently used information, request targeted services from a server 208, and/or upload the frequently used information to a server cache for later use.

Figure 4A:
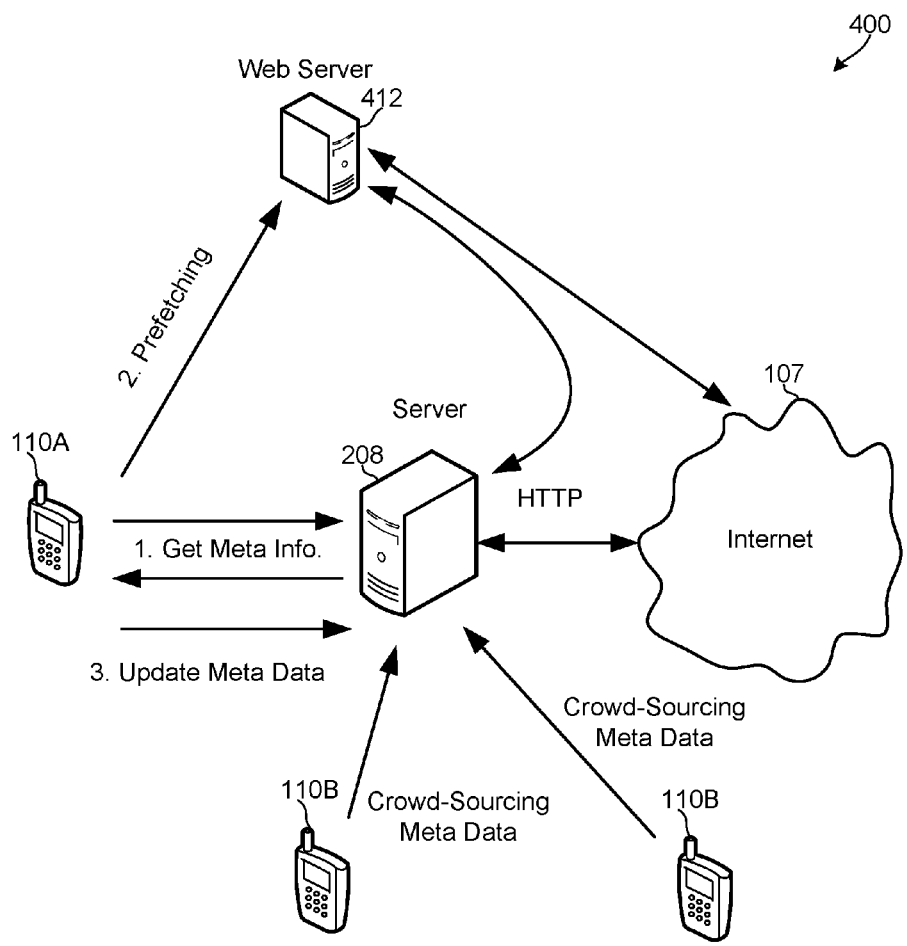
FIG. 4A is a network diagram illustrating example information flows in a crowd-sourcing server configuration in accordance with an aspect.

FIG. 4A illustrates example information flows in a crowd-sourcing embodiment method 400 in accordance with various aspects. In the illustrated example of FIG. 4A, the meta information is managed by a dedicated crowd-sourcing server 208. Mobile computing devices 110B may send meta information about a webpage to the dedicated crowd-sourcing server 208, which may collect and distribute page load meta information, crowd source meta information for different webpages received from different clients, and cache resources according to the meta information. When a client mobile computing device 110A, or client, requests the page, the client 110A may first send its local cache status and current network condition to the crowd-sourcing server 208. Based on meta information from both the mobile computing devices 110B and the crowd-sourcing server 208, the parties (e.g., client 110A and crowd-sourcing server 208) may cooperatively decide what resources are required. This crowd-sourcing server 208 may be configured to support various server operations, such as compressing the payload or changing the order of the objects that are sent. The crowd-sourcing server 208 may send a list to the client 110A that identifies the resources required to improve network usage and reduce the overall page load times. The client 110A may request the information from a web server 412 based on the received list. The client 110A may then receive (e.g., via the crowd-sourcing server 208) the information from the web server 412 and render the page. After rendering the webpage, the client 110A may send updated meta information to the crowd-sourcing server 208, and the above mentioned process may be repeated.

Figure 4B:
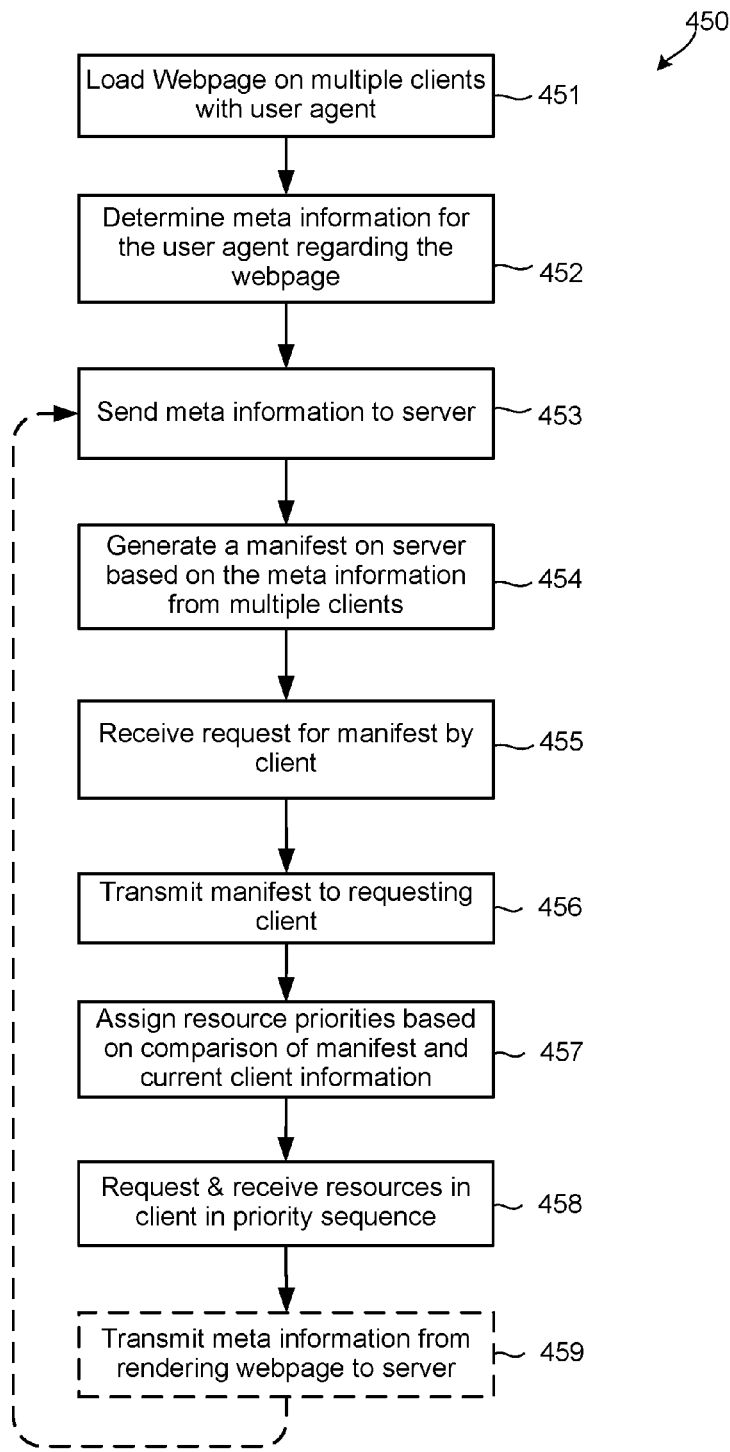
FIG. 4B is a flow diagram of a crowd-sourcing method for creating and utilizing manifests to speed page loads in accordance with an aspect.

FIG. 4B illustrates a method 450 for creating and utilizing a crowd-sourced webpage manifest. In block 451, multiple clients running on computing devices may load a webpage with resources (e.g., objects, scripting files, HTML code) received from a web server maintaining the webpage. The clients may determine meta information based on or as part of the processes of loading and accessing the webpage with a user agent in block 452. The meta information may be different for each individual webpage and each type of user agent employed in accessing the webpage may generate a meta information set that is different from meta information sets generated by other types of user agents. In block 453, each of the multiple clients may send their respective meta information to a server for storage and processing. In block 454, the server may generate a manifest for a particular webpage from the received meta information relating to the webpage. In an aspect, the server may employ a database to record the manifest organized or indexed according to the webpage (e.g., the webpage's global URL) and user agent type. Such an organization may enable the server to recall from the database the appropriate webpage manifest in response to a request for a particular webpage from a particular type of user agent.

In block 455, the server may receive a request for the manifest of a specified webpage from a client intending to access the webpage. This request may identify both the desired webpage and the client's user agent identifying information. In block 456, the server may use the received webpage identifier and the client user agent identifying information to locate within a database the appropriate manifest, and transmit that manifest to the requesting client. In block 457, the requesting client may receive the transmitted manifest and use the information in the manifest to assign priorities to resources required for the webpage by comparing the manifest information with current client information, such as cached webpage elements. The operations performed in block 457 may include comparing the manifest to cached resources and objects, dependencies, layout information, etc., and to the current network status (e.g., bandwidth, delay estimate, etc.). The client may assign priorities to the resources needed to load the webpage (i.e., resources identified in the manifest that are not stored in cache). In block 458, the client may transmit requests for resources necessary to load the webpage in a sequence determined by the assign priorities, and receive the requested resources from the web server. Optionally, the client may generate meta-information as part of completing the operations of rendering the webpage, and transmit such meta-information to the server in optional block 459. The server may update the manifest relating to the webpage in block 453, and the process may continue to be repeated in response to each webpage request received from any number of clients.

Figure 4C:
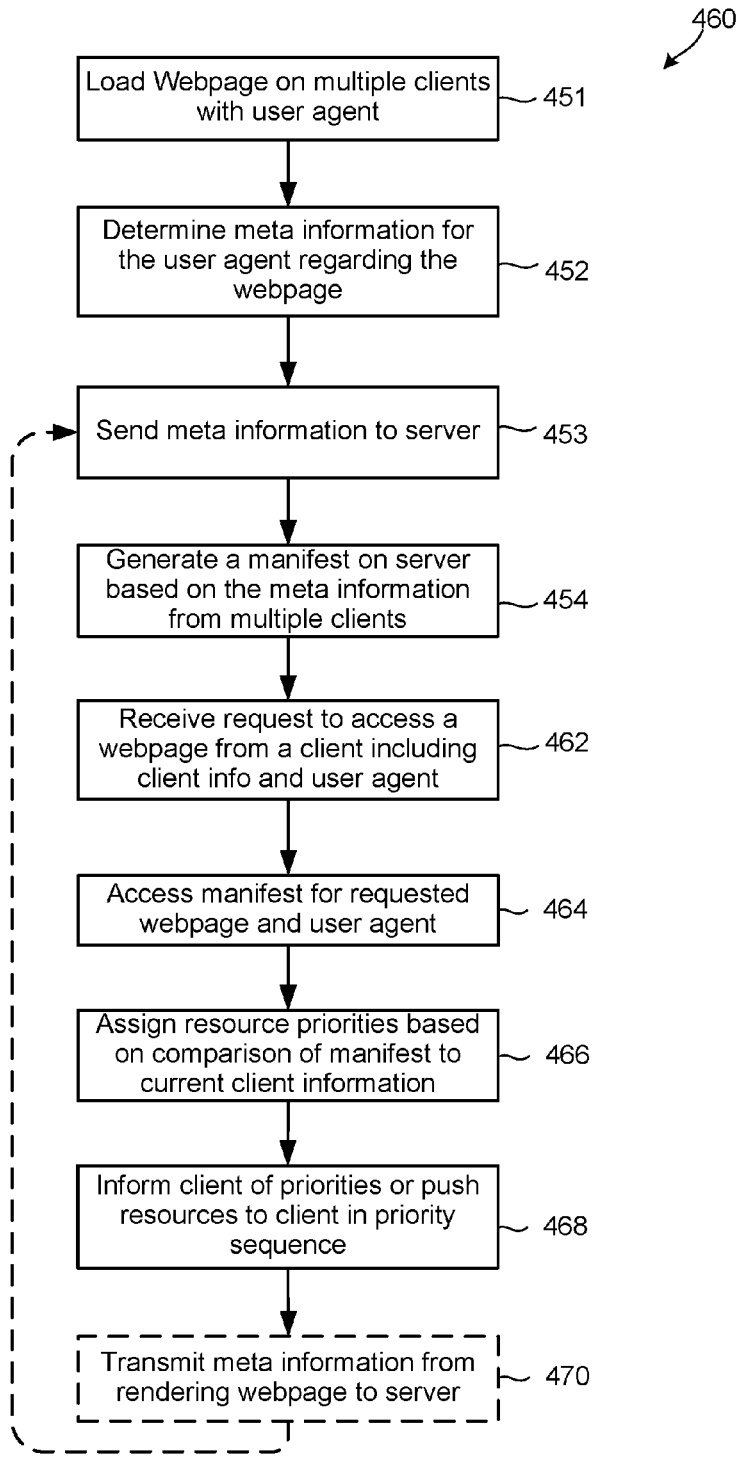
FIG. 4C is a process flow diagram of a crowd-sourcing method for creating and utilizing manifests to speed page loads in accordance with another aspect.

In another aspect, the server may determine the priority for resources and push those resources to the requesting client instead of transmitting the manifest to the client. An example method 460 implementing this embodiment is illustrated in FIG. 4C. Similar to method 400 described above, multiple clients running on computing devices may load a webpage with resources (e.g., objects, scripting files, HTML code) received from a web server maintaining the webpage in block 451. The clients may determine meta information based on or as part of the processes of loading and accessing the webpage with a user agent in block 452. The meta information may be different for each individual webpage and each type of user agent employed in accessing the webpage may generate a meta information set that is different from meta information sets generated by other types of user agents. In block 453, each of the multiple clients may send their respective meta information to a server for storage and processing. In block 454, the server may generate a manifest for a particular webpage from the received meta information relating to the webpage. In an aspect, the server may employ a database to record the manifest organized or indexed according to the webpage (e.g., the webpage's global URL) and user agent type. Such an organization may enable the server to recall from the database the appropriate webpage manifest in response to a request for a particular webpage from a particular type of user agent.

In block 462, the server may receive a request from a client to access a particular webpage. That request may include an identifier of the webpage that is requested (e.g., a URL), an identifier of the user agent, and information related to a current status of the client, in particular objects and resources related to the webpage that cached in memory and locally available to the client. This information enables the server to determine the objects and resources identified in the corresponding webpage manifest that are not already present on the requesting device. In block 464, the server may access the appropriate manifest for the requested webpage and the client's user agent. As discussed above, this may be accomplished by using the webpage identifier and user agent information as index terms for accessing a database of manifests. In block 466, the server may compare the manifest to the client information received in block 462 to identify the resources and objects that need to be transmitted and assigned resource priorities to the information that needs to be transmitted to the client. Using this information, in block 468 the server may inform the client requesting the webpage of the identified priorities to enable the client to request those objects and resources in the indicated priority order. Alternatively, in block 468, the server may simply push the resources and objects to the client in the identified priority sequence. The requesting client may then render the webpage using received resources and objects. Optionally, the client may generate meta-information as part of completing the operations of rendering the webpage, and transmit such meta-information to the server in optional block 470. The server may update the manifest relating to the webpage in block 453, and the process may continue to be repeated in response to each webpage request received from any number of clients.

Figure 5A:
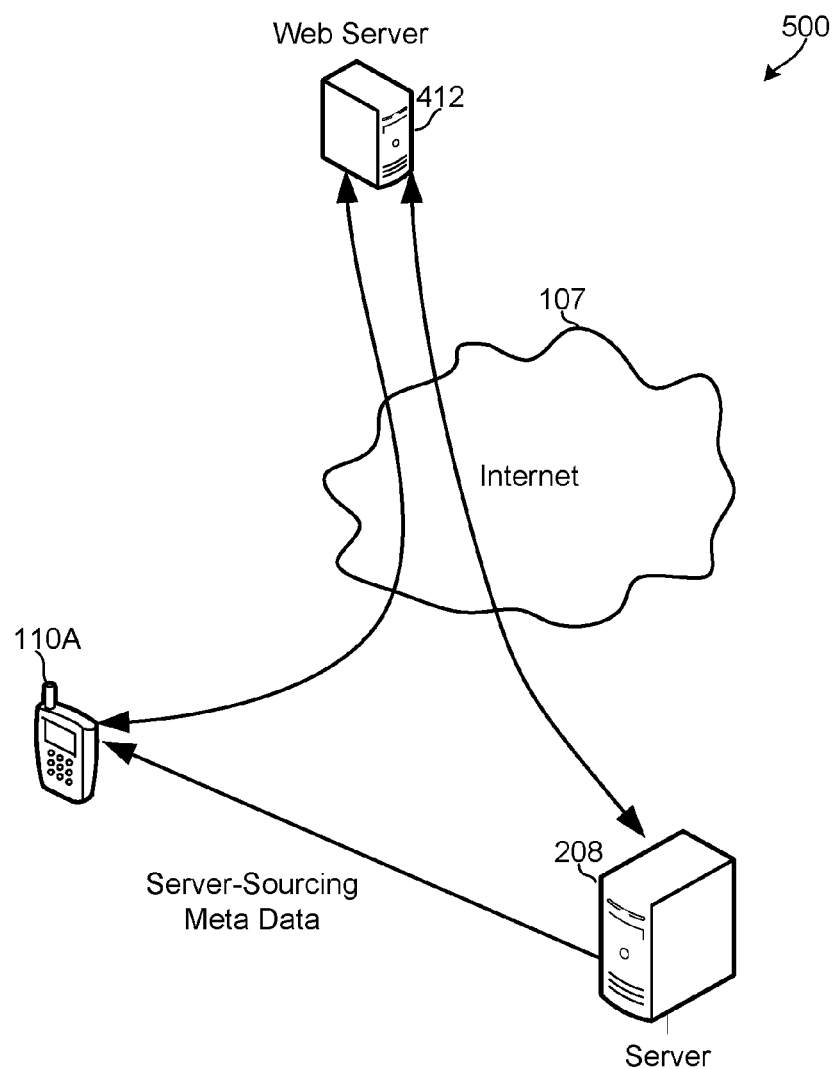
FIG. 5A is a network diagram illustrating example information flows in a server-sourcing server configuration in accordance with an aspect.

As mentioned above with reference to FIG. 3, instead of receiving meta-information from a plurality of user client mobile computing devices and developing a crowd-sourced set of webpage manifest, the server may generate such meta-information itself by rendering webpages using a number of proxy user agents. FIG. 5A illustrates example information flows in such a server-sourcing implementation 500 in accordance with various aspects. In the example illustrated in FIG. 5A, the meta information may be generated by a dedicated server 208. Unlike a crowd-sourcing implementation, the server 208 may request webpage information (i.e. HTML code, scripting content, style sheets, images, etc.) directly from a web server 412. The server 208 may emulate various types of user agents (e.g., e.g. desktop, iOS® operating system, Android® operating system) to render each webpage, and may retrieve different information from the web server 412 as the webpage is processed by each emulated user agent type. The server 208 may generate page load meta information that describes the resources required for loading a webpage, dependencies between components, and other information that a client 110A may use to improve network usage and reduce the overall page load times. From this meta information, the server 208 may generate a manifest which may be stored in a database associated with the server 208.

When a client 110A is tasked to render a webpage, the client 110A may request the manifest from the server 208, and compare the meta information to current local information (e.g., cached data, current network status, etc.). Through this comparison, the client 110A may prioritize and order webpage resource retrieval. The client 110A may then request the required webpage elements in the order of priorities, receive the needed content from the web server 412, and render the page. In an aspect, the client 110A may upload meta information to the server 208 which may incorporate that information into its stored manifests, or use the feedback to fine tune its proxy user agents or the process by which manifests are generated. In an aspect, the server 208 may push the webpage content to the client 110A. In another aspect, the client 110A may transmit its current local information (e.g., cached data, current network status, etc.) to the server 208 which may compare it to the manifest of the webpage to determine a resource retrieval sequence for the client 110A. In another aspect, the webpage may be maintained on the server 208.

Figure 5B:
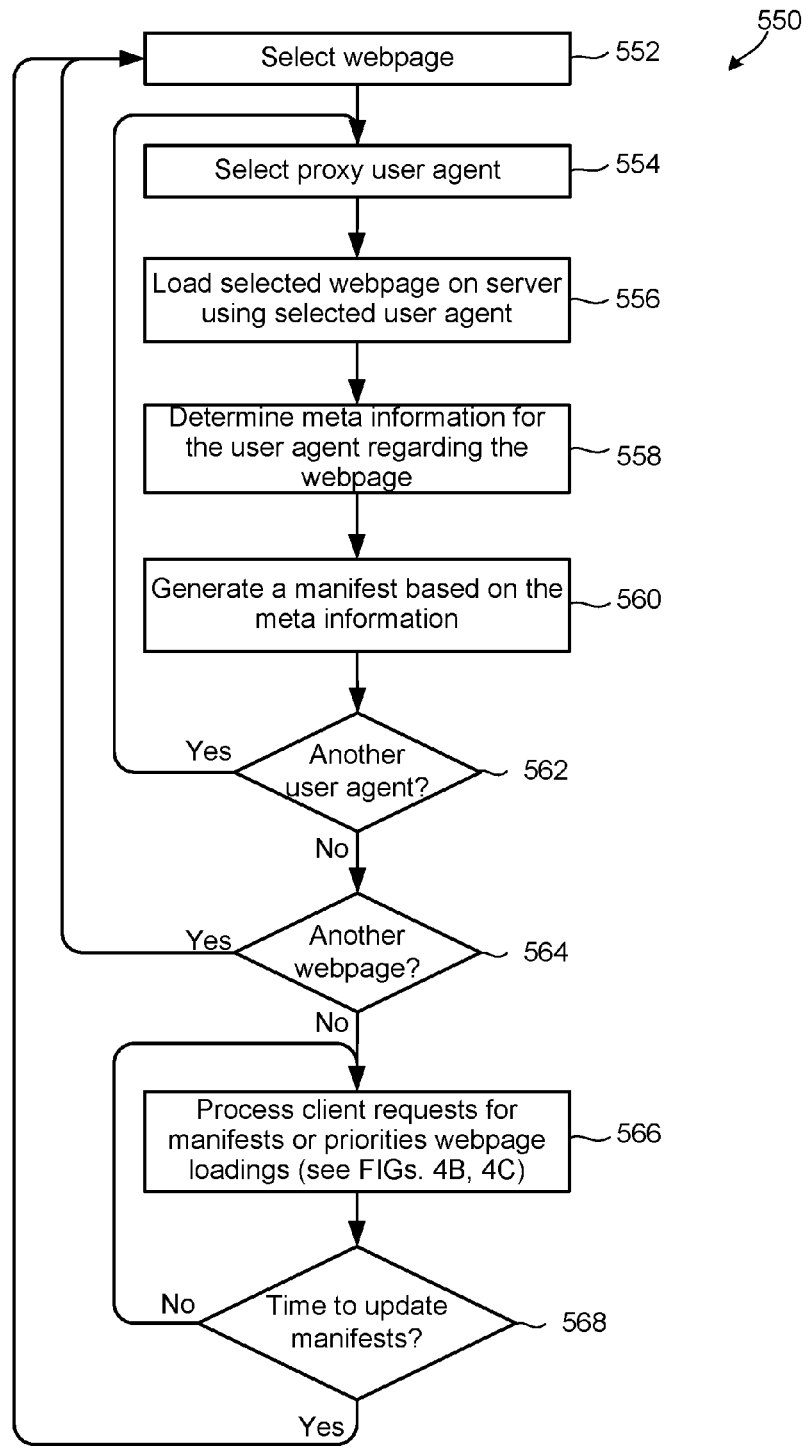
FIG. 5B is a process flow diagram of a server-sourcing method for creating and utilizing manifests to speed page loads in accordance with an aspect.

FIG. 5B illustrates an example method 550 that may be implemented in a server for generating webpage manifests using server-generated meta-information. In method 550 in block 552, the server may select a particular webpage for processing. This selection may be made among a large number of webpages for which the server is offering manifest services to clients. For example, the server may be configured to generate manifests for the top 1000 webpages based on their popularity, and select individual webpages from that list for processing in block 552. Alternatively or in addition, the server may periodically receive requests for a particular webpage that has not been previously processed, in which case, the server may select that webpage for processing as part of block 552 in response to the client request. In this manner, the server may generate manifests on demand when necessary or desirable.

As mentioned above, different manifests may be generated for each type of a user agent since user agents may process webpages in a different manner, and thus require different prioritization or meta-information. So, in block 554, the server may select a first proxy user agent for use in processing the accessed webpage. In block 556, the server may use the selected proxy user agent to load or otherwise process the selected webpage, and determine meta-information for the selected user agent rendering the selected webpage in block 558. In block 560, the server may generate a manifest based on the meta-information generated in block 558, and store the manifest in the database of manifests.

In determination block 562, the server may determine whether there is another user agent for which a manifest should be generated. When there is another user agent to be processed (i.e., determination block 562="yes"), the server may return to block 554 to select the next proxy user agents for processing. Once the selected webpage has been processed with all of the proxy user agents used by the server (i.e., determination block 562="no"), the server may determine whether there is another webpage to be processed in determination block 564. If there is another webpage to be processed (i.e., determination block 564="yes"), the server may return to block 552 to select the next webpage for processing, which may proceed as described above. Once all of webpages have been processed using all proxy user agents (i.e., determination block 564="no"), the server may process client requests for webpage manifests as described above with reference to FIG. 4 B and foresee in block 566.

Since webpages change frequently as content is added, deleted, and updated, the server may be configured to periodically refresh or regenerate webpage manifests. The scheduling for webpage manifest updates may depend upon the type or contents of each webpage. For example, the manifests for news webpages may be updated very frequently, such as every 5 to 10 minutes, since their content changes rapidly, while manifests for corporate webpages may be updated weekly or monthly consistent with the rate of change of their content. Such scheduling of webpage manifest updates may be determined on a webpage-by-webpage basis, such as based upon information learned by the server over time from updating manifests. For example, the server may compare a newly generated manifest to its previous version to determine the degree to which the manifest has changed during the time between updates. If the server determines that the manifests are not changing as often as the manifest is being updated or regenerated, the server may adjust its schedule for updating that webpage's manifest accordingly. Similarly, if the server determines that the manifest-to-manifest changes are significant, the server may increase the periodicity of manifest updates for that particular webpage. In other embodiments, the server may follow a simple update schedule, such as hourly, nightly or weekly.

Using such an update schedule, in determination block 568, the server may determine for each webpage whether it is time to update its manifest. So long as a webpage does not require updating (i.e., while determination block="no"), the server may continue to support client requests for manifests for the webpage in block 566. When the server determines that it is time to update the manifest for a particular webpage or group of webpages (i.e., determination block 568="yes"), the server may return to block 552 to select the webpage for updating. By repeating the operations in the manner described above, the server can maintain up-to-date manifests for a large number of webpages while processing requests from clients for webpages or webpage manifests.

Figure 6:
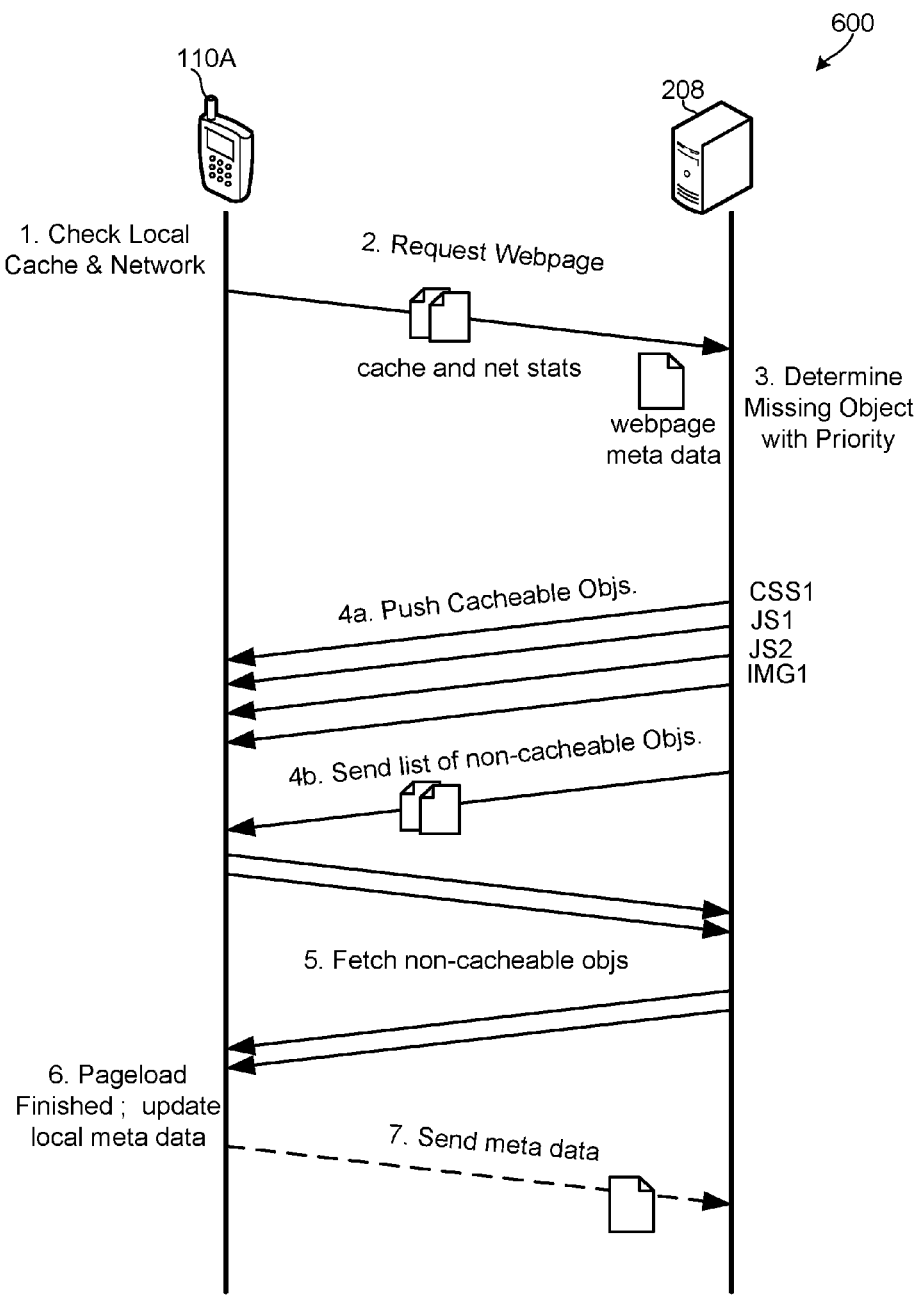
FIG. 6 is a communications diagram illustrating information flows in a server centric aspect method for speeding page loads.

FIG. 6 illustrates information flows in an aspect method 600 for speeding page loads in a server centric implementation in which a server 208 identifies and selects the content that is to be delivered to the client 110A, and determines the sequence in which the selected content is to be delivered. In the illustrated example of FIG. 6, the client 110A begins with a cold cache and the network condition is good. In operation 1, the client 110A may examine its local cache status against local meta information (e.g., what resources/objects are the cache, dependencies, layout information, etc.) and network condition (e.g., uplink and downlink, bandwidth, RTT delay estimate, etc.). In operation 2, the client 110A may send a request for a webpage to a proxy server 208, along with its local cache status and network condition. In operation 3, based on the latest available manifest relating to the requested webpage, the proxy server 208 may determine what resources should be received by the client 110A by performing operations that may include: determining what resources are missing on the client side; determining an optimal request sequence or priority based on dependency/layout information; determining if there are resources that block other resources and/or have higher priority; if there are images or objects on top of the page/in the viewport that should have higher priority than the other images/objects; and other similar operations. In operation 4a, based on network condition and cache-ability of the missing requests, the server 208 may decide to perform one or more of the following operations: push all missing cacheable resources to the client 110A in the order defined in operation 3; send back (i.e., push) the list of missing objects (e.g., in the order defined in Operation 3) back to client 110A for it to preload (preload hinting); perform resource processing operations (e.g., client 110A has a small screen and should receive lower quality images); transcode resources into different formats (e.g., lower quality or desired object format of a client 110A, etc.) if needed; compress resources; perform URL redirect operations for the client 110A; fetch necessary resources for the client 110A; and other similar operations. In operation 4b, the server 208 may send a list of all non-cacheable objects to the client 110A. In operation 5, the client 110A may request resources or receive objects pushed by the server 208 according to the received list. In operation 6, the client 110A may finish loading the page and update local meta information. In optional operation 7, the client 110A may upload the updated meta information to the server 208 for use in modifying the manifest relating to the webpage.

Figure 7:
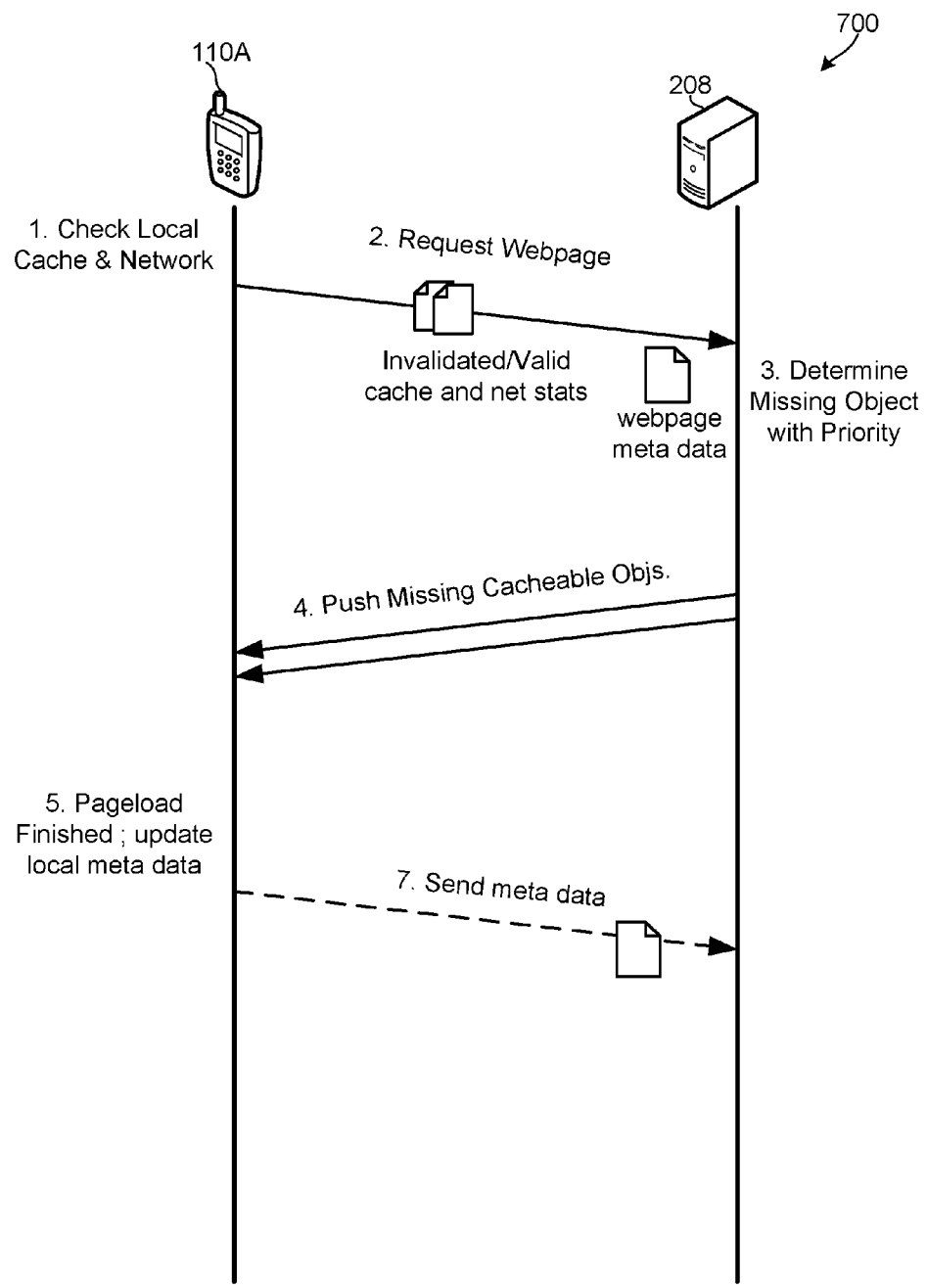
FIG. 7 is a communications diagram illustrating information flows in another aspect method for speeding page loads in a server centric configuration.

FIG. 7 illustrates information flows in another aspect method 700 for speeding page loads in a server centric configuration. In the illustrated example of FIG. 7, the client cache is partially invalidated (e.g., expired, evicted, etc.), there are no non-cacheable resources, and the network condition is good. In operation 1, the client 110A may examine local cache status against local meta information and network condition. In operation 2, the client 110A may send a request to the webpage to the proxy server 208, along with invalidated and valid cache and network stats. In operation 3, based on the latest manifest information at hand, the proxy server 208 may: determine which resources are missing on the client side; determine an optimal request sequence/priority order (e.g., based on dependency/layout information); identify resources that block other resources having higher priority; determine if images/objects on top of the page/in the viewport should be given higher priority; and other similar operations. In operation 4, based on the network condition, the server 208 may fetch resources for the client 110A (if necessary) and push all missing cacheable resources to the client 110A in the order defined in operation 3. In operation 5, the client 110A may finish loading the page and update local meta information. In optional operation 6, the client 110A may upload the updated meta information to the server 208 for use in modifying the manifest relating to the webpage.

Figure 8:
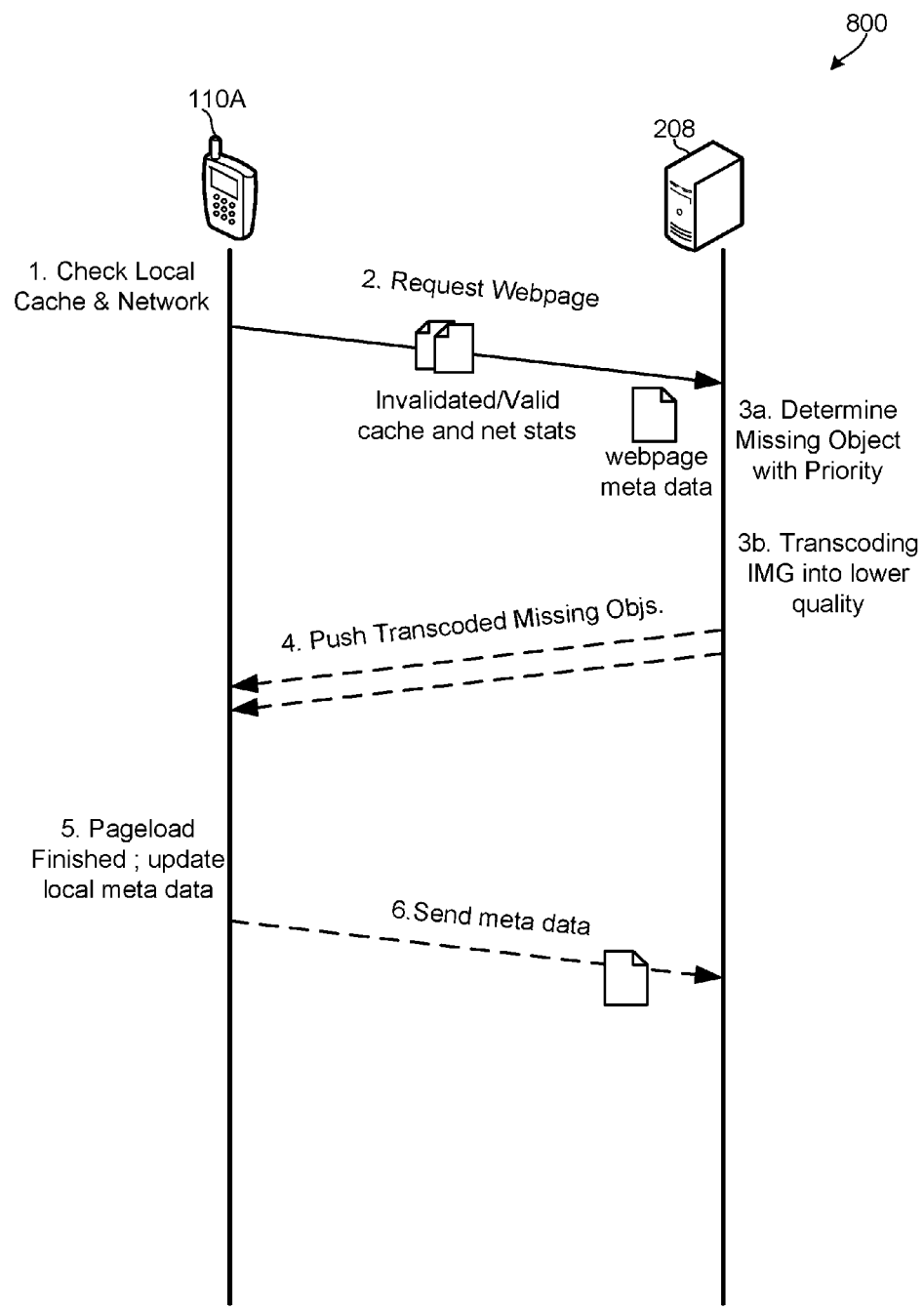
FIG. 8 is a communications diagram illustrating information flows in yet another aspect method for speeding page loads in a server centric configuration.

FIG. 8 illustrates information flows in yet another aspect method 800 for speeding page loads in a server centric configuration. In the illustrated example of FIG. 8, the client cache is partially invalidated (e.g., expired, evicted, etc.), there are no non-cacheable resources, and the network condition is bad (e.g., low bandwidth). In operation 1, the client 110A may examine local cache status against local meta information and network conditions. In operation 2, the client 110A may send a webpage request to the proxy server 208, along with invalidated and valid cache and network stats. In operation 3a, based on the latest manifest at hand, the proxy server 208 may: determine which resources are missing on the client side; determine an optimal request sequence or priority order (e.g., based on dependency and/or layout information); identify resources that block other resources having a higher priority; and determine if there are images/objects on top of the page or in the viewport that should be given a higher priority. In operation 3b, the server 208 may reduce the size of the payload to transmit by, for example, transcoding resources into lower quality (or different object format) or compressing JavaScript, CSS, and HTML objects (e.g., based on the meta information indicating the network condition is bad). In operation 4, the server 208 may push the transcoded missing objects to the client 110A in the order defined in operation 3. In operation 5, the client 110A may finish loading the page and update local meta information. In optional operation 6, the client 110A may upload the updated meta information to the server 208 for use in modifying the manifest relating to the webpage.

Figure 9:
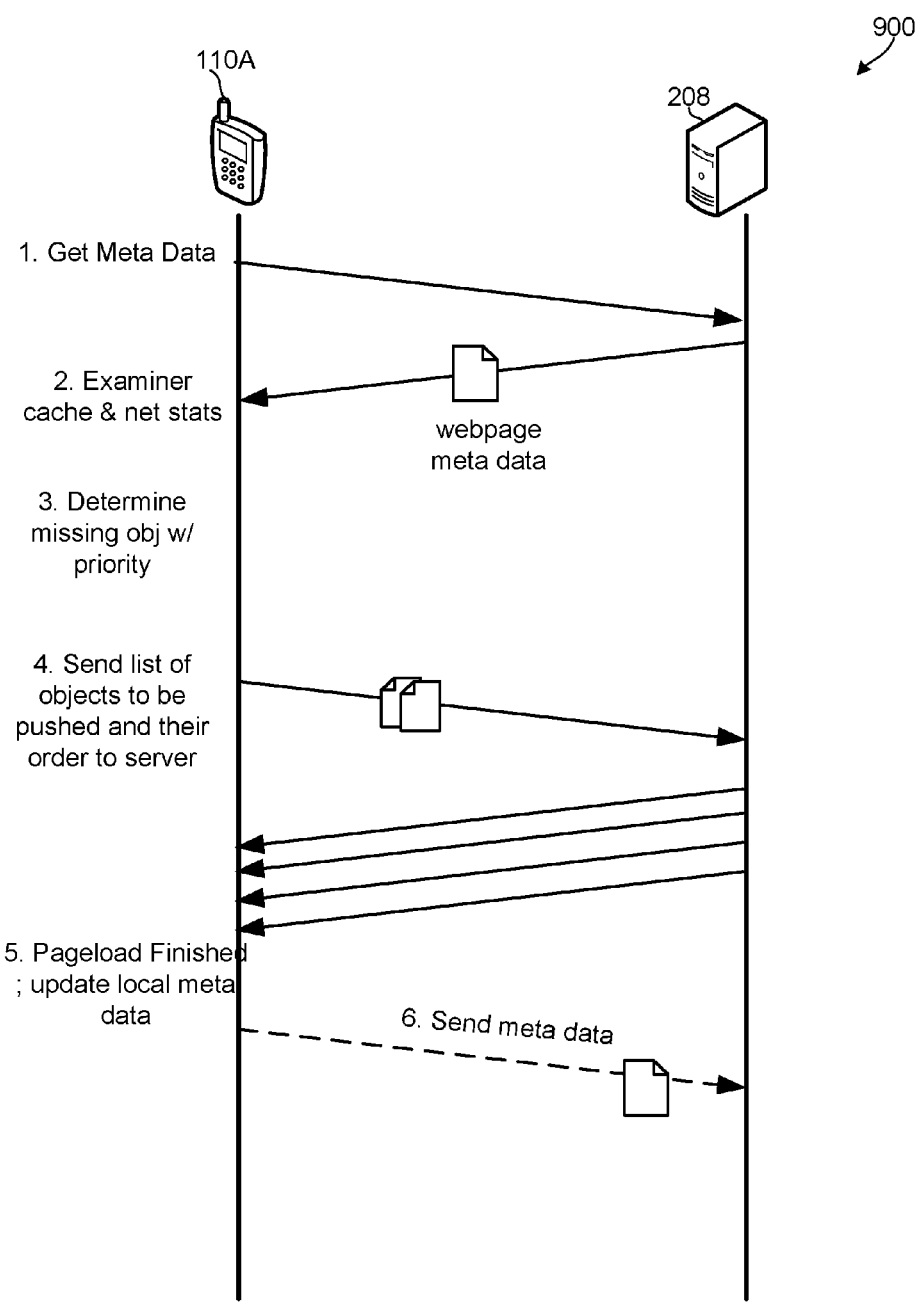
FIG. 9 is a communications diagram illustrating information flows in an aspect method for speeding page loads in a client centric configuration in which the decision on what contents are to be downloaded, and the sequence in which the objects are to be downloaded, is determined by the client.

FIG. 9 illustrates information flows in an aspect method 900 for speeding page loads in a client centric configuration in which the decisions on what contents are to be downloaded and the sequence in which the objects are to be downloaded are made by the client 110A. In the illustrated example of FIG. 9, the client 110A contains a partially invalidated cache, the network conditions are good, and the server 208 supports push operations. In operation 1, the client 110A may fetch the manifest pertaining to the desired webpage from the proxy server 208. In operation 2, the client 110A may examine the local cache status (e.g., determining what objects are in the cache, object dependencies, etc.) and the network condition (e.g., bandwidth, delay estimate, etc.). In operation 3, based on the manifest, the client 110A may: determine which resources are missing and should be fetched; determine an optimal request sequence/priority order (e.g., based on dependency/layout/network condition information); identify resources that block other resources having higher priorities; determine if there are images/objects on top of the page/in the viewport that should be given a higher priority; and perform other similar operations. In operation 4, according to the server's capabilities (which may be indicated in the meta information received from the server 208) the client 110A may send a list of the objects and their priorities to the server 208, which may receive the list and push the requested objects to the client 110A in the requested order/in accordance with their priorities. In operation 5, the client 110A may finish loading the page and update local meta information. In optional operation 6, the client 110A may upload the updated meta information to the server 208 for use in modifying the manifest relating to the webpage.

Figure 10:
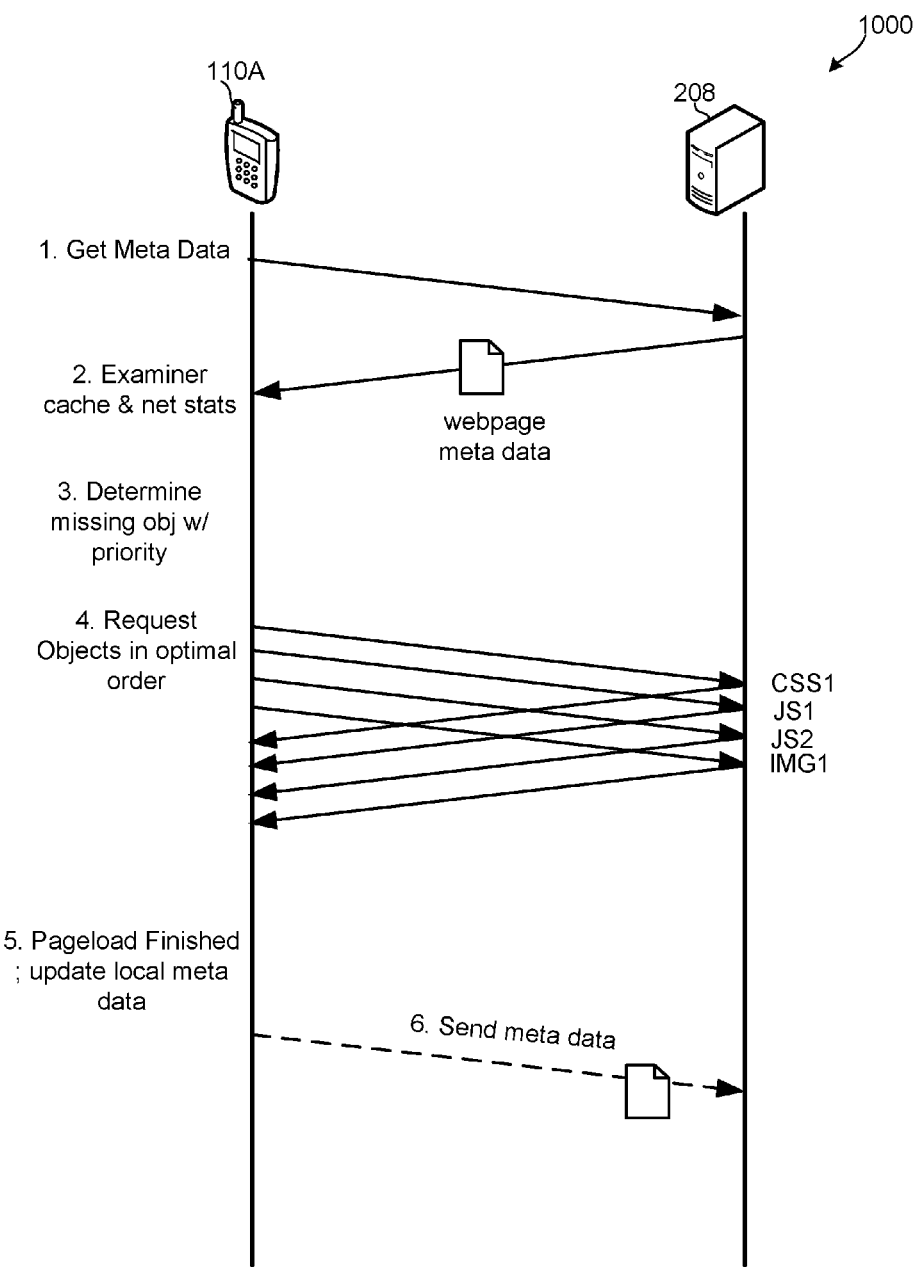
FIG. 10 is a communications diagram illustrating information flows in another aspect method for speeding page loads in a client centric configuration.

FIG. 10 illustrates information flows in another aspect method 1000 for speeding page loads in a client centric configuration. In the illustrated example of FIG. 10, the client 110A contains a partially invalidated cache and the network conditions are good, but unlike the example illustrated in FIG. 9, the server 208 does not support push operations. In this configuration, as with all client centric configurations, the decision on what contents are to be downloaded, and the sequence in which the objects are to be downloaded, may be determined by the client 110A.

In operation 1, the client 110A may fetch the manifest from the proxy server 208 regarding the webpage it has been directed to download. In operation 2, client 110A may examine local cache status (e.g., determining what is in the cache) and the network condition (e.g., bandwidth, delay estimate, etc.). In operation 3, based on the latest meta information available, the client 110A may: determine which resources are missing and should be fetched; determine an optimal request sequence/priority order (e.g., based on dependency/layout/network condition information); identify resources that block other resources having higher priorities; determine if there are images/objects on top of the page/in the viewport that should be given a higher priority; and perform other similar operations. In operation 4, according to the server's capabilities (e.g., as indicated in meta information received from the server 208) the client 110A may send a series of requests to the proxy/web-server to receive missing objects in the optimal sequence derived in operation 3. The server 208 may receive the requests for objects from the client 110A and send the requested objects to the client 110A in an optimal order, which may be computed using the meta information. In operation 5, the client 110A may finish loading the page and update local meta information. In optional operation 6, the client 110A may upload the updated meta information to the server 208 for use in modifying the manifest relating to the webpage.

By comparing local client information to the manifest relating to the desired webpage, a client 110A or server 208 implementing the various aspects may determine the object delivery order (e.g., priorities) based on the scenario (e.g., network conditions), configuration (e.g., client centric, server centric, etc.), or any combination thereof. Various aspects may enable clients 110A to improve object delivery order by considering factors such as object dependencies, object size, current network condition, cold cache, device types, etc. For example, if a default object delivery order (e.g., the default order set by a browser) is CSS1, IMG1, JS1, IMG2, IMG3, JS3, IMG4, a client 110A implementing the various aspects may determine that the order CSS1, JS1, JS3, IMG2, IMG1, IMG3, IMG4 is more efficient, and change the delivery sequence accordingly. Additionally, the request order and the receive order may be different based on the availability of networking capabilities such as HTTP pipelining with request IDs.

In an aspect, the server 208 may determine whether the objects currently reside in a client cache and deliver only the objects that are not currently cached on the client 110A. Likewise, a client 110A may request only non-cached items be sent by the server 208. Alternatively, if the client 110A device changes its resource profile, such as going from 3G to WiFi or connecting to a larger display via a docking station, the client 110A may ignore previous cache content and download all new web resources. In any case, resources may be delivered to the client 110A in sequence, in accordance with their assigned priorities determined from the appropriate webpage manifest.

Figure 11A:
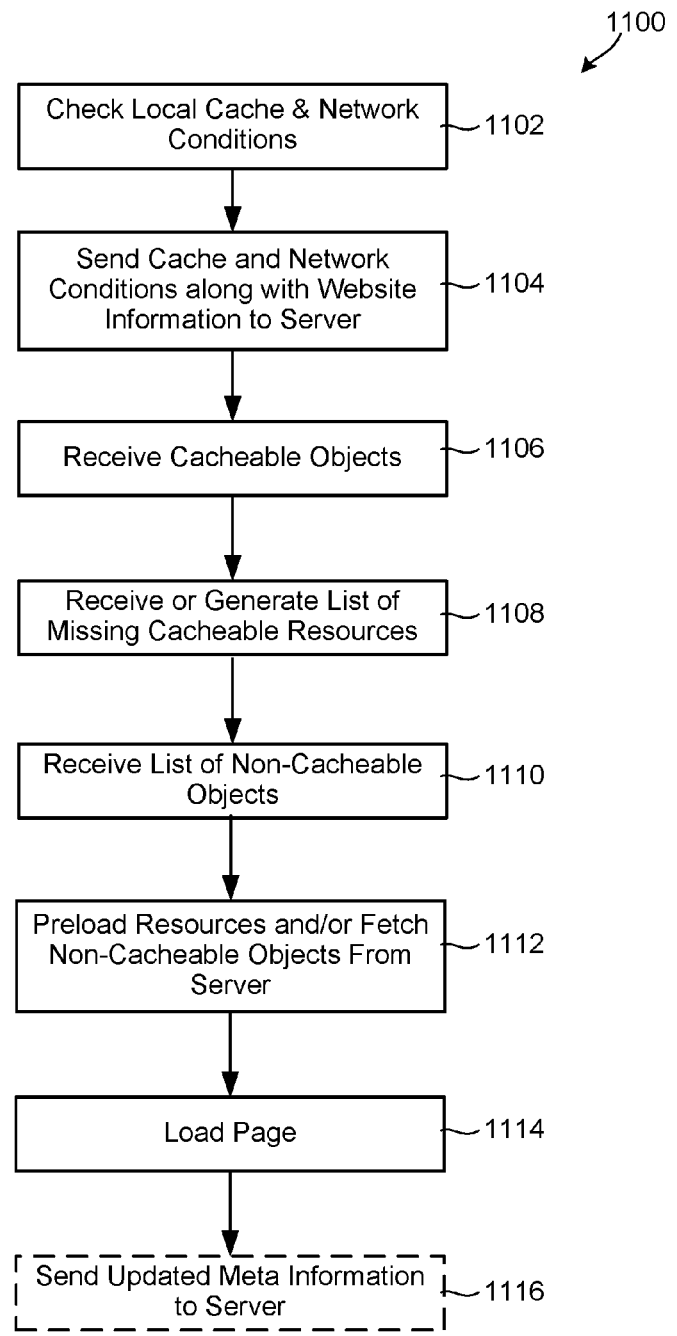
FIG. 11A is a process flow diagram of a client aspect method for speeding page loads in a server centric implementation.

FIG. 11A illustrates a client implemented method 1100 for speeding page loads in a server centric implementation in which a server identifies and selects the content that is to be delivered to the client. In the example illustrated in FIG. 11A, the client begins with a cold cache and the network condition is good. In block 1102, the client may examine its local cache status against local meta information (e.g., to identify the resources/objects that are in the cache, dependencies, layout information, etc.) and network conditions (e.g., bandwidth, delay estimate, etc.). In block 1104, the client may send a request for a webpage to a proxy server, along with its local cache status and network condition. In block 1106, the client may receive all missing cacheable resources in a defined order/sequence based on comparisons of local meta information to the appropriate manifest for the webpage. In block 1108, the client may receive or generate a list of missing cacheable objects and priorities. In block 1110, the client may receive a list of all non-cacheable objects. In block 1112, the client may request resources based on the received list of missing objects and/or fetch non cacheable objects. In block 1114, the client may load the page using the received objects in accordance with their respective priorities and update its local meta information. In optional block 1116, the client may upload the meta information to the server for use in modifying the manifest relating to the webpage.

Figure 11B:
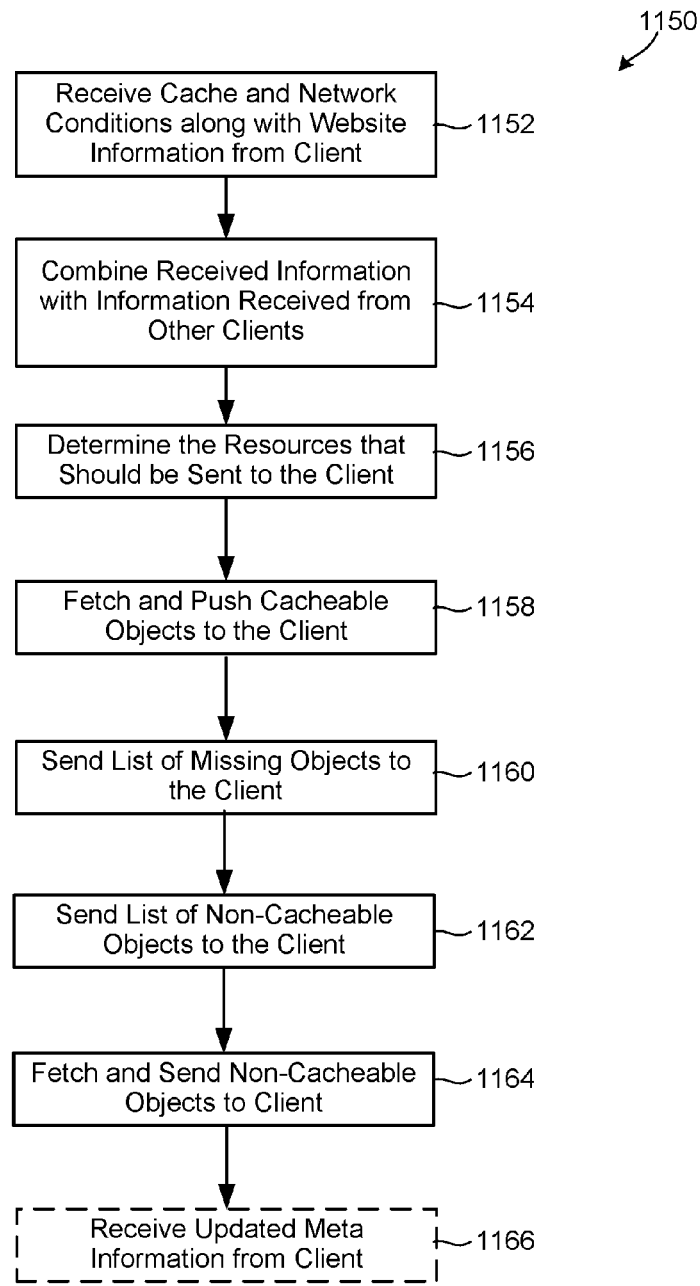
FIG. 11B is a process flow diagram of a server aspect method for speeding page loads in a server centric implementation.

FIG. 11B illustrates a server implemented method 1150 for speeding page loads in a server centric implementation in which a server identifies and selects the content that is to be delivered to the client. In the illustrated example of FIG. 11B, the client begins with a cold cache and the network condition is good. In block 1152, the server may receive webpage information along with meta information and network condition information from a client. In block 1154, the server may combine (e.g., crowd source) the received information with previously received information (e.g., from previous visits, other clients, multiple websites, etc.) to produce a manifest related to the webpage. In block 1156, the server may determine the resources that should be sent to the client based on the latest manifest available. As part of block 1156, the server may determine the resources that are missing on the client side, determine an optimal sequence for delivering those objects to the client, determine whether there are resources that block other resources having a higher priority, and perform other similar operations.

In block 1158, based on network conditions and cacheability of the missing requests, the server may fetch and push missing cacheable resources to the client in the determined sequence. In block 1160, the server may send a list of missing objects to the client. In block 1162, the server may send a list of all non-cacheable objects to the client. In block 1164, the server may fetch and push the non-cacheable objects to the client, in sequence, in accordance with their determined priorities. In optional block 1166, the server may receive updated meta information from the client and update the manifest relating to the webpage.

Figure 12A:
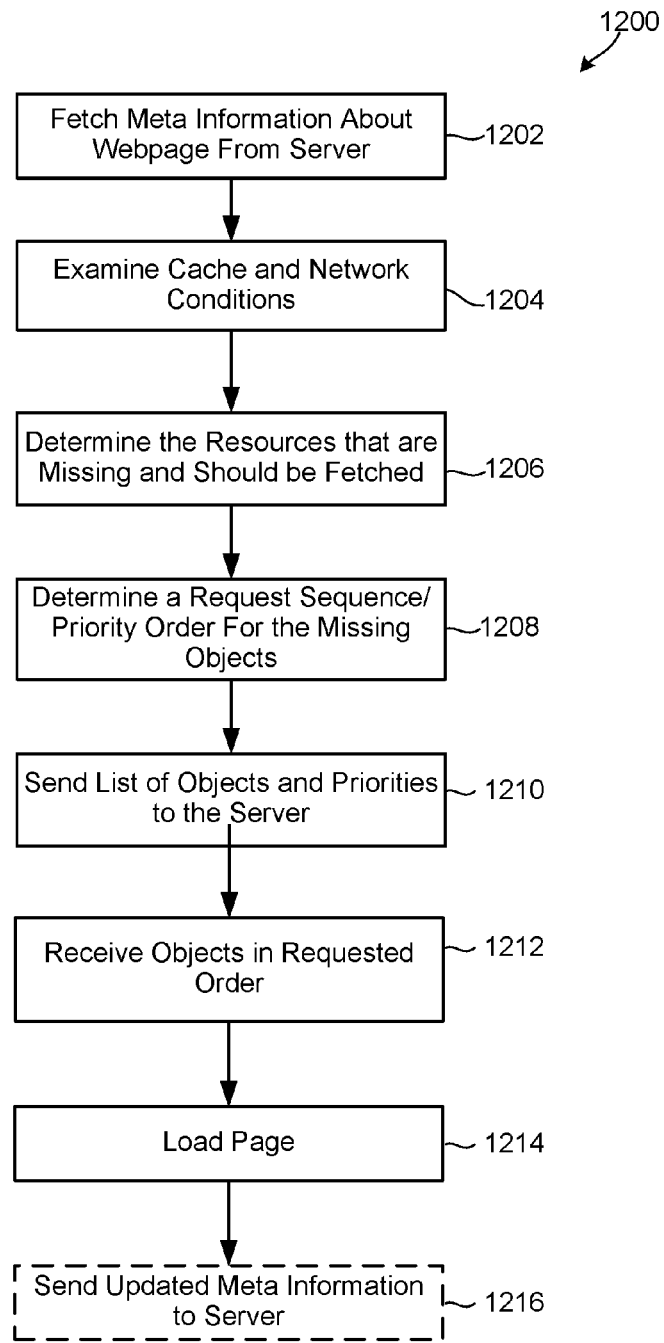
FIG. 12A is a process flow diagram of a client aspect method for speeding page loads in a client centric implementation.

FIG. 12A illustrates a client implemented method 1200 for speeding page loads in a client centric implementation in which the decisions on the contents that are to be downloaded and the sequence in which the objects are to be downloaded are made by the client. In the example illustrated in FIG. 12A, the client contains a partially invalidated cache and the network conditions are good. In block 1202, the client may fetch meta information from the proxy server about the webpage it requests to download. In block 1204, the client may examine the local cache status (e.g., determining the objects that are in the cache, object dependencies, etc.) and the network conditions (e.g., bandwidth, delay estimate, etc.). In block 1206, based on the latest manifest available as maintained by the server, the client may determine the resources that are missing and should be fetched. In block 1208, the client may determine an optimal sequence/priority for receiving the objects, which may be determined based on the server's capabilities identified by the meta information. In block 1210, the client may send a list of the required objects and their priorities to the server. In block 1212, the client may receive the requested objects in the requested sequence, in accordance with their determined priorities. In block 1214, the client may load the page and update its local meta information. In optional block 1216, the client may upload the updated meta information to the server for its use in modifying the manifest relating to the webpage.

Figure 12B:
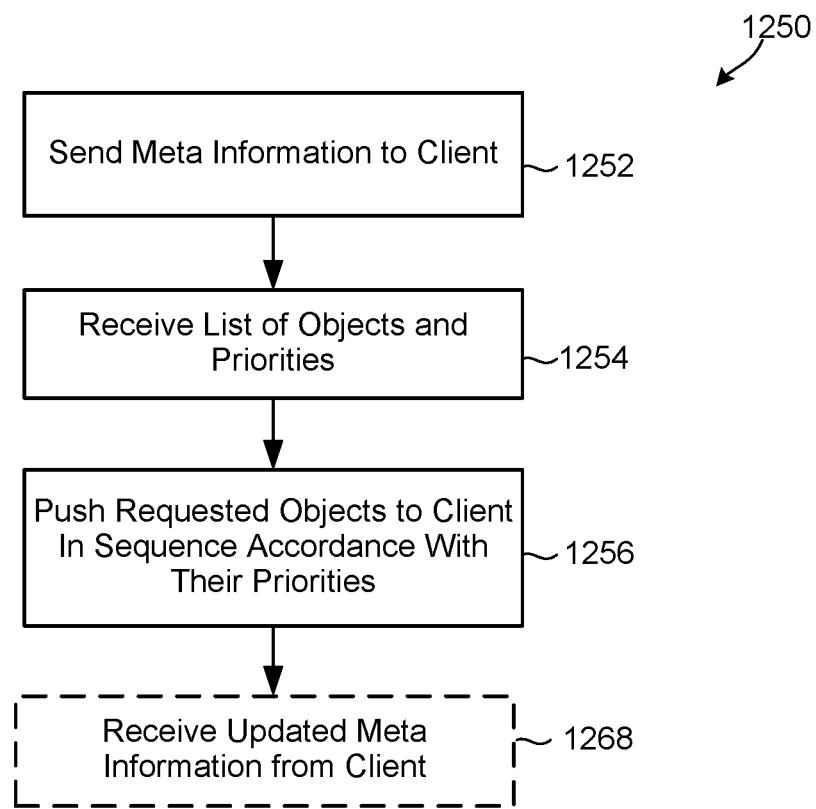
FIG. 12B is a process flow diagram of a server aspect method for speeding page loads in a client centric implementation.

FIG. 12B illustrates a server implemented method 1250 for speeding page loads in a client centric implementation in which the decisions on the contents that are to be downloaded and the sequence in which the objects are to be downloaded are made by the client. In the example illustrated in FIG. 12B, the client contains a partially invalidated cache, the network conditions are good, and the server supports push operations. In block 1252, the server may send a client a manifest relating to a webpage that the client requests to download. The client may determine an optimal sequence/priority for receiving the objects, and send a series of prioritized object requests back to the server. In block 1254, the server may receive a list of objects and their respective priorities. In block 1256, the server may push the requested objects to the client in a sequence in accordance with their priorities. In optional block 1258, the server may receive updated meta information from the client and update the manifest relating to the webpage.

Figure 13:
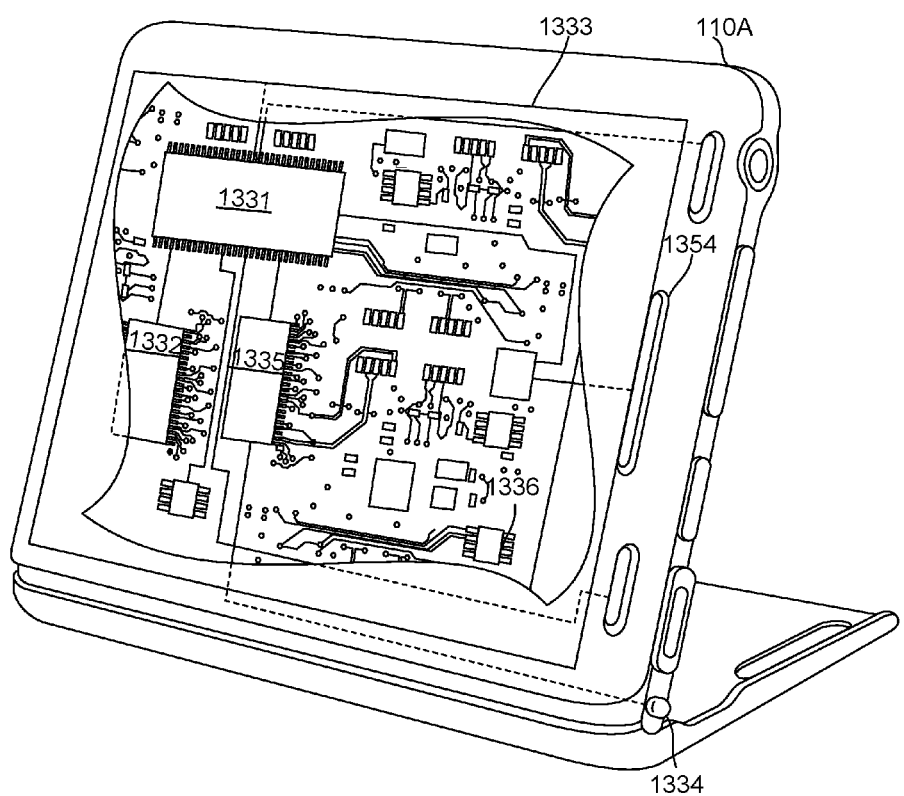
FIG. 13 is a component block diagram of a mobile computing device suitable for use with the various aspects.

FIG. 13 is a system block diagram of a mobile computing device suitable for use with any of the aspects. A typical mobile computing device 110A may include a processor 1331 coupled to internal memory 1332, a display 1333, and to a speaker 1354. Additionally, the mobile computing device may include an antenna 1334 for sending and receiving electromagnetic radiation that may be connected to a wireless data link and/or cellular telephone transceiver 1335 coupled to the processor 1331 and a mobile multimedia broadcast receiver 1336 coupled to the processor. Mobile computing devices 110A typically also include menu selection buttons or rocker switches for receiving user inputs.

Figure 14:
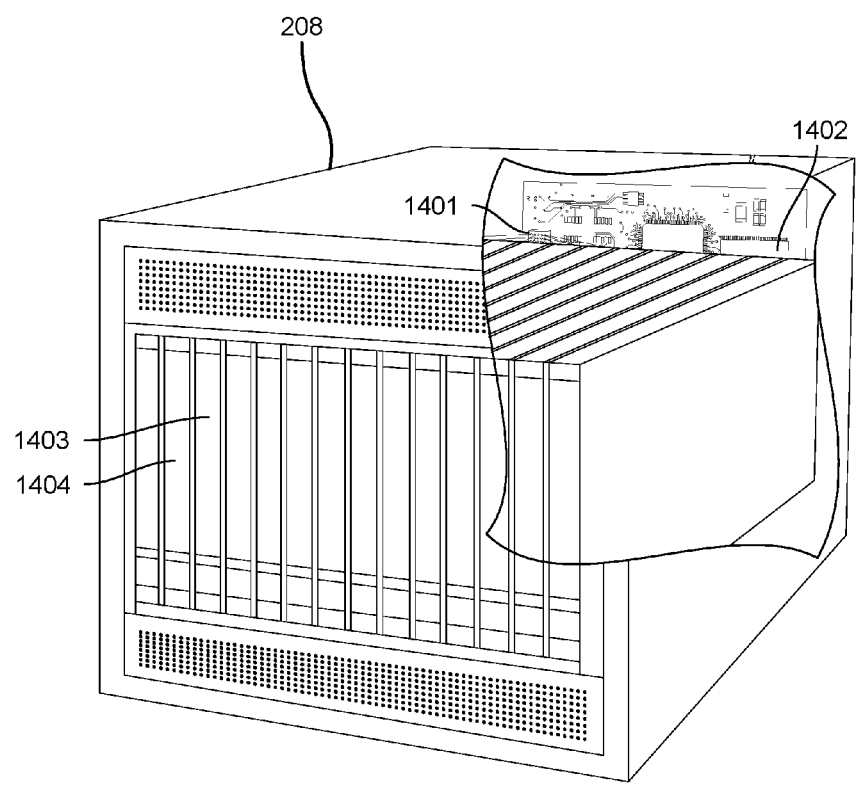
FIG. 14 is a component block diagram of a server computing device suitable for use with the various aspects.

The various aspects may be implemented on any of a variety of commercially available server devices, such as the server 208 illustrated in FIG. 14. Such a server 208 typically includes a processor 1401, and may include multiple processor systems 1411, 1421, 1431, one or more of which may be or include multi-core processors. The processor 1401 may be coupled to volatile internal memory 1402 and a large capacity nonvolatile memory, such as a disk drive 1403. The server 208 may also include a floppy disc drive, compact disc (CD) or DVD disc drive coupled to the processor 1401. The server 208 may also include network access ports 1404 coupled to the processor 1401 for establishing data connections with a network, such as a local area network coupled to other broadcast system computers and servers.

Figure 15:
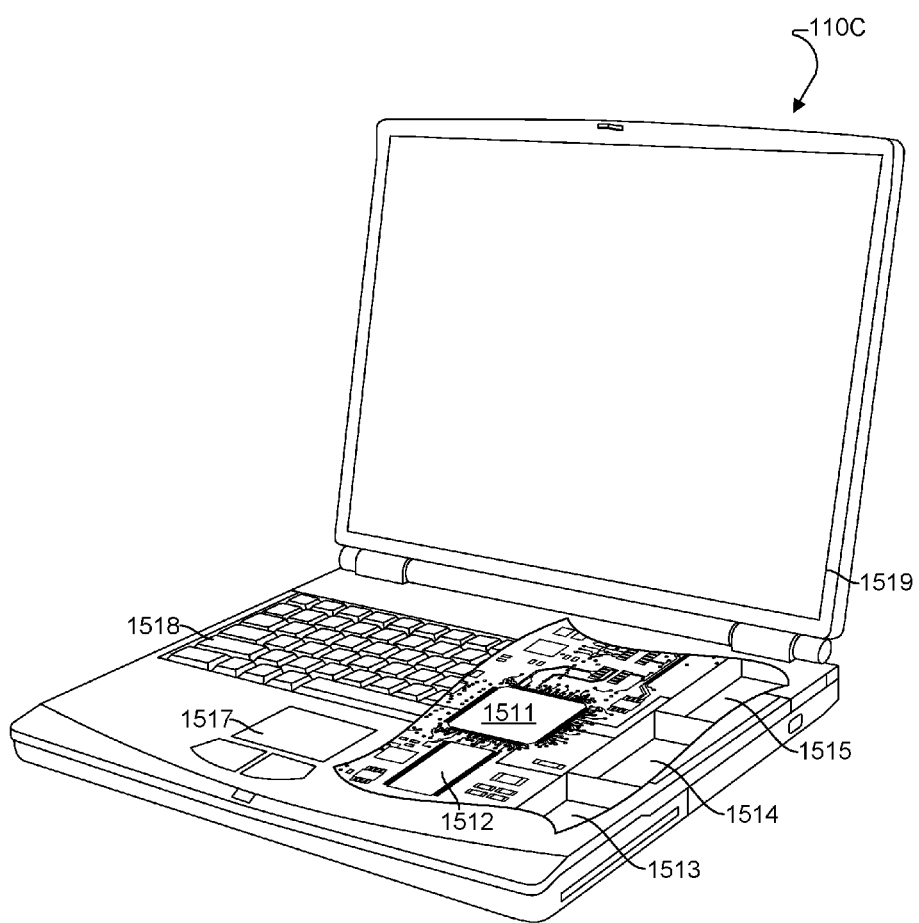
FIG. 15 is a component block diagram of a notebook computing device suitable for use with the various aspects.

The aspects described above may also be implemented within a variety of personal computing devices, such as a laptop computer 110C as illustrated in FIG. 15. Many laptop computers include a touch pad touch surface 1517 that serves as the computer's pointing device, and thus may receive drag, scroll, and flick gestures similar to those implemented on mobile computing devices equipped with a touch screen display and described above. A laptop computer 110C will typically include a processor 1511 coupled to volatile memory 1512 and a large capacity nonvolatile memory, such as a disk drive 1513 of Flash memory. The laptop computer 110C may also include a floppy disc drive 1514 and a compact disc (CD) drive 1515 coupled to the processor 1511. The laptop computer 110C may also include a number of connector ports coupled to the processor 1511 for establishing data connections or receiving external memory devices, such as a USB or FireWire® connector sockets, or other network connection circuits for coupling the processor 1511 to a network. In a notebook configuration, the computer housing includes the touchpad 1517, the keyboard 1518, and the display 1519 all coupled to the processor 1511. Other configurations of computing device may include a computer mouse or trackball coupled to the processor (e.g., via a USB input) as are well known, which may also be used in conjunction with the various aspects.

The processors 1331, 1401, 1411, 1421, 1431, and 1511 may be any programmable microprocessor, microcomputer or multiple processor chip or chips that can be configured by software instructions (applications) to perform a variety of functions, including the functions of the various aspects described above. In some devices, multiple processors 1331, 1401, 1411, 1421, 1431, and 1511 may be provided, such as one processor dedicated to wireless communication functions and one processor dedicated to running other applications. Typically, software applications may be stored in the internal memory 1332, 1402, and 1403 before they are accessed and loaded into the processor 1331, 1401, 1411, 1421, 1431, and 1511. The processor 1331, 1401, 1411, 1421, 1431, and 1511 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1331, 1401, 1411, 1421, 1431, and 1511 including internal memory or removable memory plugged into the device and memory within the processor 1331, 1401, 1411, 1421, 1431, and 1511 itself.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable or processor-readable storage medium. The steps of a method or algorithm disclosed herein may be embodied in a processor-executable software module executed which may reside on a non-transitory computer-readable medium. Non-transitory computer-readable and processor media include any available storage media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for supporting rendering of a webpage, comprising:
    generating, on a first mobile computing device, meta information related to rendering the webpage;
    transmitting, to a crowd-sourcing server from the first mobile computing device, the generated meta information;
    receiving the generated meta information in the crowd-sourcing server;
    generating a manifest for the webpage based on the meta information received from the first mobile computing device;
    using the manifest to assign priorities to resources used for rendering the webpage on a second mobile computing device;
    receiving the resources on the second mobile computing device in a sequence determined based on their assigned priorities; and
    rendering the webpage on the second mobile computing device.

2. The method of claim 1, further comprising the second mobile computing device transmitting to the crowd-sourcing server meta information generated during the rendering of the webpage on the second mobile computing device.

3. The method of claim 1, wherein using the manifest to assign priorities to the resources used for rendering the webpage on the second mobile computing device comprises:
    transmitting information identifying the webpage to the crowd-sourcing server;
    obtaining the manifest for the webpage;
    transmitting the obtained manifest to the second mobile computing device;
    identifying in the second mobile computing device the resources used for rendering the webpage on the second mobile computing device by comparing the manifest to information stored on the second mobile computing device; and
    assigning priorities to the identified resources in the second mobile computing device based on the manifest.

4. The method of claim 3, wherein receiving the resources on the second mobile computing device in the sequence determined by their assigned priorities comprises the second mobile computing device requesting download of the resources from a web server in the sequence determined by the second mobile computing device based on the manifest.

5. The method of claim 1, wherein using the manifest to assign priorities to the resources used for rendering the webpage on the second mobile computing device comprises:
    transmitting information relating to the second mobile computing device to the crowd-sourcing server;

obtaining the manifest for the webpage;

comparing, in the crowd-sourcing server, the obtained manifest to the information relating to the second mobile computing device;

identifying, in the crowd-sourcing server, priorities and appropriate object formats for the resources used for rendering the webpage on the second mobile computing device; and transmitting to the second mobile computing device the identified priorities and appropriate object formats for the resources used for rendering the webpage on the second mobile computing device.

6. The method of claim 5, wherein receiving the resources on the second mobile computing device in the sequence determined based on their assigned priorities comprises the crowd-sourcing server pushing the resources to the second mobile computing device in the sequence determined by the crowd-sourcing server based on the manifest.

7. The method of claim 6, further comprising the crowd-sourcing server transcoding the resources to a desired format for the second mobile computing device.

8. The method of claim 1, wherein the meta information comprises one or more of information of a user agent, a list of object uniform resource locators, object dependency information, object type information, size information, and layout information.

9. A method for supporting rendering of a webpage, comprising:

receiving, at a crowd-sourcing server, meta information from a first mobile computing device, the meta information generated during rendering the webpage at the first mobile computing device;

generating a manifest for the webpage based on the received meta information;

using the manifest to assign priorities to resources used for rendering the webpage on a second mobile computing device;

receiving the resources on the second mobile computing in a sequence determined based on their assigned priorities; and rendering the webpage on the second mobile computing device.

10. The method of claim 9, further comprising, after finishing the rendering of the webpage, transmitting to the crowd-sourcing server meta information generated by the second mobile computing device during the rendering of the webpage.

11. The method of claim 9, wherein using the manifest to assign priorities to the resources used for rendering the webpage on the second mobile computing device comprises:

transmitting the manifest to the second mobile computing device for evaluation with information relating to the second mobile computing device;

identifying in the second mobile computing device the resources used for rendering the webpage on the second mobile computing device; and assigning priorities to the identified resources in the second mobile computing device.

12. The method of claim 11, wherein receiving the resources on the second mobile computing device in the sequence determined by their assigned priorities comprises the second mobile computing device requesting download of the resources from a web server in the sequence determined by the second mobile computing device based on the manifest.

13. The method of claim 9, wherein using the manifest to assign priorities to the resources used for rendering the webpage on the second mobile computing device comprises:

transmitting information relating to the second mobile computing device to the crowd-sourcing server;

obtaining the manifest for the webpage;

comparing, in the crowd-sourcing server, the obtained manifest to the information relating to the second mobile computing device;

identifying, in the crowd-sourcing server, priorities and appropriate object formats for the resources used for rendering the webpage on the second mobile computing device; and transmitting to the second mobile computing device the identified priorities and appropriate object formats for the resources used for rendering the webpage on the second mobile computing device.

14. The method of claim 13, wherein receiving the resources on the second mobile computing device in the sequence determined based on their assigned priorities comprises the crowd-sourcing server pushing the resources to the second mobile computing device in the sequence determined by the crowd-sourcing server based on the manifest.

15. The method of claim 14, further comprising the crowd-sourcing server transcoding the resources to a desired format for the second mobile computing device.

16. The method of claim 9, wherein the meta information comprises one or more of information of a user agent, a list of object uniform resource locators, object dependency information, object type information, size information, and layout information.

17. A first mobile computing device, comprising:
a memory; and
a processor coupled to the memory, and configured with processor-executable instructions to perform operations comprising:

transmitting information identifying a webpage to a crowd-sourcing server;

receiving a manifest from the crowd-sourcing server for the webpage, wherein the manifest was generated by the crowd-sourcing server based on meta information received from a second mobile computing device, and wherein the meta information was generated by the second mobile computing device during a rendering of the webpage;

identifying resources used for rendering the webpage by comparing the manifest to information stored on the first mobile computing device;

assigning priorities to the identified resources based on the manifest;

receiving the resources in a sequence determined based on their assigned priorities; and rendering the webpage.

18. The first mobile computing device of claim 17, wherein the processor is configured with processor-executable instructions such that receiving the resources in the sequence determined based on their assigned priorities comprises requesting download of the resources from a web server in the sequence based on the manifest.

19. The first mobile computing device of claim 17, further comprising, after finishing the rendering of the webpage, transmitting to the crowd-sourcing server meta information generated by the processor of the first mobile computing device during the rendering of the webpage by the processor of the first mobile computing device.

20. The first mobile computing device of claim 17, wherein the meta information comprises one or more of information of a user agent, a list of object uniform resource locators, object dependency information, object type information, size information, and layout information.

21. A crowd-sourcing server, comprising:
    a memory; and
    a server processor coupled to the memory and configured with server processor-executable instructions to perform operations comprising:
        receiving meta information from a first mobile computing device, the meta information generated as a result of rendering a webpage at the first mobile computing device;
        generating a manifest for the webpage based on the received meta information;
        using the manifest to assign priorities to resources used for rendering the webpage on a second mobile computing device; and
        transmitting the resources to the second mobile computing device in a sequence determined based on their assigned priorities.

22. The crowd-sourcing server of claim 21, wherein the server processor is configured with server processor-executable instructions such that using the manifest to assign priorities to the resources used for rendering the webpage on the second mobile computing device comprises transmitting the manifest to the second mobile computing device for evaluation with information relating to the second mobile computing device.

23. The crowd-sourcing server of claim 21, wherein the server processor is further configured with server processor-executable instructions to perform operations comprising receiving meta information from the second mobile computing device generated by the second mobile computing device during a rendering of the webpage by the second mobile computing device.

24. The crowd-sourcing server of claim 21, wherein the server processor is configured with server processor-executable instructions such that using the manifest to assign priorities to the resources used for rendering the webpage on the second mobile computing device comprises:
    receiving information relating to the second mobile computing device;
    evaluating the received information using the manifest;
    identifying priorities and appropriate object formats for the resources used for rendering the webpage on the second mobile computing device; and
    transmitting to the second mobile computing device the identified priorities and appropriate object formats for the resources used for rendering the webpage on the second mobile computing device.

25. The crowd-sourcing server of claim 24, wherein the server processor is configured with server processor-executable instructions such that transmitting the resources to the second mobile computing device in the sequence determined based on their assigned priorities comprises pushing the resources to the second mobile computing device in the sequence based on the manifest.

26. The crowd-sourcing server of claim 25, wherein the server processor is configured with server processor-executable instructions to perform operations further comprising transcoding the resources to a desired format for the second mobile computing device.

27. The crowd-sourcing server of claim 21, wherein the meta information comprises one or more of information of a user agent, a list of object uniform resource locators, object dependency information, object type information, size information, and layout information.

28. A first mobile computing device, comprising:
    means for transmitting information identifying a webpage to a crowd-sourcing server;
    means for receiving a manifest from the crowd-sourcing server for the webpage, wherein the manifest was generated by the crowd-sourcing server based on meta information received from a second mobile computing device, and wherein the meta information was generated by the second mobile computing device during a rendering of the webpage;
    means for identifying resources used for rendering the webpage by comparing the manifest to information stored on the first mobile computing device;
    means for assigning priorities to the identified resources based on the manifest;
    means for receiving the resources in a sequence determined based on their assigned priorities; and
    means for rendering the webpage.

29. The mobile computing device of claim 28, wherein the means for receiving the resources in the sequence determined based on their assigned priorities comprises means for requesting download of the resources from a web server in the sequence based on the manifest.

30. The mobile computing device of claim 28, further comprising means for transmitting to the crowd-sourcing server meta information generated by the first mobile computing device during the rendering of the webpage, wherein the meta information is transmitted by the first mobile computing device after the first mobile computing device has finished the rendering of the webpage.

31. The mobile computing device of claim 28, wherein the meta information comprises one or more of information of a user agent, a list of object uniform resource locators, object dependency information, object type information, size information, and layout information.

32. A crowd-sourcing server, comprising:
    means for receiving meta information from a first mobile computing device, the meta information generated as a result of rendering a webpage at the first mobile computing device;
    means for generating a manifest for the webpage based on the received meta information;
    means for using the manifest to assign priorities to resources used for rendering the webpage on a second mobile computing device; and
    means for transmitting the resources to the second mobile computing device in a sequence determined based on their assigned priorities.

33. The crowd-sourcing server of claim 32, wherein the means for using the manifest to assign priorities to the resources used for rendering the webpage on the second mobile computing device comprises means for transmitting the manifest to the second mobile computing device for evaluation with information relating to the second mobile computing device.

34. The crowd-sourcing server of claim 32, further comprising means for receiving meta information from the second mobile computing device generated by the second mobile computing device during a rendering of the webpage by the second mobile computing device.

35. The crowd-sourcing server of claim 32, wherein the means for using the manifest to assign priorities to the resources used for rendering the webpage on the second mobile computing device comprises:
    means for receiving information relating to the second mobile computing device;

means for evaluating the received information using the manifest;

means for identifying priorities and appropriate object formats for the resources used for rendering the webpage on the second mobile computing device; and means for transmitting to the second mobile computing device the identified priorities and appropriate object formats for the resources used for rendering the webpage on the second mobile computing device.

36. The crowd-sourcing server of claim 35, wherein the means for transmitting the resources to the second mobile computing device in the sequence determined based on their assigned priorities comprises means for pushing the resources to the second mobile computing device in the sequence based on the manifest.

37. The crowd-sourcing server of claim 36, further comprising means for transcoding the resources to a desired format for the second mobile computing device.

38. The crowd-sourcing server of claim 32, wherein the meta information comprises one or more of information of a user agent, a list of object uniform resource locators, object dependency information, object type information, size information, and layout information.

39. A non-transitory processor-readable storage medium having stored thereon processor-executable software instructions configured to cause a processor of a first mobile computing device to perform operations comprising:

transmitting information identifying a webpage to a crowd-sourcing server;

receiving a manifest from the crowd-sourcing server for the webpage, wherein the manifest was generated by the crowd-sourcing server based on meta information received from a second mobile computing device, and wherein the meta information was generated by the second mobile computing device during a rendering of the webpage;

identifying resources used for rendering the webpage by comparing the manifest to information stored on the first mobile computing device;

assigning priorities to the identified resources based on the manifest;

receiving the resources in a sequence determined based on their assigned priorities; and rendering the webpage.

40. The non-transitory processor-readable storage medium of claim 39, wherein the stored processor-executable software instructions are configured to cause a processor to perform operations such that receiving the resources in the sequence determined based on their assigned priorities comprises requesting download of the resources from a web server in a sequence based on the manifest.

41. The non-transitory processor-readable storage medium of claim 39, wherein the stored processor-executable software instructions are configured to cause the processor to perform operations further comprising transmitting to the crowd-sourcing server meta information generated by the processor of the first mobile computing device during the rendering of the webpage by the processor of the first mobile computing device, wherein the meta information is transmitted after the processor of the first mobile computing device has finished the rendering of the webpage.

42. The non-transitory processor-readable storage medium of claim 39, wherein the meta information comprises one or more of information of a user agent, a list of object uniform resource locators, object dependency information, object type information, size information, and layout information.

43. A non-transitory server-readable storage medium having stored thereon server processor-executable instructions configured to cause a server processor of a crowd-sourcing server to perform operations comprising:

receiving meta information from a first mobile computing device, the meta information generated as a result of rendering a webpage at the first mobile computing device;

generating a manifest for the webpage based on the meta information;

using the manifest to assign priorities to resources used for rendering the webpage on a second mobile computing device; and transmitting the resources to the second mobile computing device in a sequence determined based on their assigned priorities.

44. The non-transitory server-readable storage medium of claim 43, wherein the stored server processor-executable instructions are configured to cause the server processor to perform operations such that using the manifest to assign priorities to the resources used for rendering the webpage on the second mobile computing device comprises transmitting the manifest to the second mobile computing device for evaluation with information relating to the second mobile computing device.

45. The non-transitory server-readable storage medium of claim 43, wherein the stored server processor-executable instructions are further configured to cause the server processor to perform operations comprising receiving meta information from the second mobile computing device generated by the second mobile computing device during rendering of the webpage by the second mobile computing device.

46. The non-transitory server-readable storage medium of claim 43, wherein the stored server processor-executable instructions are configured to cause a server processor to perform operations such that using the manifest to assign priorities to the resources used for rendering the webpage on the second mobile computing device comprises:

receiving information relating to the second mobile computing device;

evaluating the received information using the manifest;

identifying priorities and appropriate object formats for the resources used for rendering the webpage on the second mobile computing device; and transmitting to the second mobile computing device the identified priorities and appropriate object formats for the resources used for rendering the webpage on the second mobile computing device.

47. The non-transitory server-readable storage medium of claim 46, wherein the stored server processor-executable instructions are configured to cause the server processor to perform operations such that transmitting the resources to the second mobile computing device in a sequence determined based on their assigned priorities comprises pushing the resources to the second mobile computing device in a sequence based on the manifest.

48. The non-transitory server-readable storage medium of claim 47, wherein the stored server processor-executable instructions are configured to cause the server processor to perform operations further comprising transcoding the resources to a desired format for the second mobile computing device.

49. The non-transitory processor-readable storage medium of claim 43, wherein the meta information comprises one or more of information of a user agent, a list of object uniform resource locators, object dependency information, object type information, size information, and layout information.

50. A system, comprising:
a crowd-sourcing server;
a first mobile computing device; and
a second mobile computing device,
wherein the first mobile computing device and the second mobile computing device each comprises:
a memory; and
a processor coupled to the memory, and the processor of the first mobile computing device is configured with processor-executable instructions to perform operations comprising:
rendering a webpage;
generating meta information during the rendering of the webpage; and
after finishing the rendering of the webpage, transmitting to the crowd-sourcing server the generated meta information,
wherein the crowd-sourcing server comprises:
a memory; and
a server processor coupled to the memory and configured with server processor-executable instructions to perform operations comprising:
receiving meta information from the first mobile computing device; and
generating a manifest, configured to provide information for assigning priorities to resources used for rendering the webpage, based on the meta information received from the first mobile computing device, and
wherein the processor of the second mobile computing device is configured with processor-executable instructions to perform operations further comprising:
receiving the resources used for rendering the webpage in a sequence determined based on the information for assigning priorities to the resources used for rendering the webpage in the manifest; and
rendering the webpage.

51. The system of claim 50, wherein the processor of the second mobile computing device is configured with processor-executable instructions to perform operations further comprising:
transmitting information identifying the webpage to the crowd-sourcing server;
receiving the manifest from the crowd-sourcing server;
identifying the resources used for rendering the webpage on the second mobile computing device by comparing the manifest to information stored on the second mobile computing device; and
assigning priorities to the identified resources in the second mobile computing device based on the manifest,
wherein the processor of the second mobile computing device is configured with processor-executable instructions such that receiving the resources used for rendering the webpage in the sequence determined based on the information for assigning priorities to the resources used for rendering the webpage in the manifest comprises:
requesting the resources for rendering the webpage in the sequence based on priorities assigned by the second mobile computing device; and
receiving the resources,
wherein the crowd-sourcing server is configured with server processor-executable instructions to perform operations further comprising:
receiving the information identifying the webpage from the second mobile computing device;
obtaining the manifest for the webpage; and
transmitting the obtained manifest to the second mobile computing device.

52. The system of claim 51, wherein the processor of the second mobile computing device is configured with processor-executable instructions such that requesting the resources used for rendering the webpage in the sequence based on priorities assigned by the second mobile computing device comprises requesting download of the resources from a web server in the sequence determined by the processor of the second mobile computing device based on the manifest.

53. The system of claim 50, wherein:
the processor of the second mobile computing device is configured with processor-executable instructions to perform operations further comprising transmitting information relating to the second mobile computing device to the crowd-sourcing server, and
the processor of the second computing device is configured with processor-executable instructions such that receiving the resources used for rendering the webpage in the sequence determined based on the information for assigning priorities to the resources used for rendering the webpage in the manifest comprises:
requesting the resources for rendering the webpage in the sequence based on priorities and appropriate object formats transmitted by the crowd-sourcing server; and
receiving the resources, and
the crowd-sourcing server is configured with server processor-executable instructions to perform operations further comprising:
receiving the information relating to the second mobile computing device;
obtaining the manifest for the webpage;
comparing the obtained manifest to the information relating to the second mobile computing device;
identifying priorities and appropriate object formats for the resources used for rendering the webpage on the second mobile computing device; and
transmitting to the second mobile computing device the identified priorities and appropriate object formats for the resources used for rendering the webpage on the second mobile computing device.

54. The system of claim 53, wherein the crowd-sourcing server is configured with server processor-executable instructions such that transmitting to the second mobile computing device the identified priorities and appropriate object formats for the resources used for rendering the webpage on the second mobile computing device comprises pushing the resources to the second mobile computing device in the sequence determined by the crowd-sourcing server based on the manifest.

55. The system of claim 54, wherein the crowd-sourcing server is configured with server processor-executable instructions to perform operations further comprising transcoding the resources to a desired format for the second mobile computing device.

56. The system of claim 50, wherein the meta information comprises one or more of information of a user agent, a list of object uniform resource locators, object dependency information, object type information, size information, and layout information.

57. A system, comprising:
a crowd-sourcing server; and
a first mobile computing device,
wherein the crowd-sourcing server comprises:
    a memory; and
    a server processor coupled to the memory and configured with server processor-executable instructions to perform operations comprising:
        receiving meta information from a second mobile computing device, the meta information generated during a rendering of a webpage at the second mobile computing device; and
        generating a manifest, configured to provide information for assigning priorities to resources used for rendering the webpage, based on the generated meta information, and
wherein the first mobile computing device comprises:
    a memory; and
    a device processor coupled to the memory and configured with processor-executable instructions to perform operations comprising:
        receiving the resources used for rendering the webpage in a sequence determined based on the information for assigning priorities to the resources used for rendering the webpage in the manifest; and
        rendering the webpage.

58. The system of claim 57, wherein the device processor is configured with processor-executable instructions to perform operations further comprising transmitting to the crowd-sourcing server meta information generated during the rendering of the webpage, wherein the meta information is transmitted after the first mobile computing device has finished the rendering of the webpage.

59. The system of claim 57, wherein the device processor is configured with processor-executable instructions to perform operations further comprising:
    transmitting information identifying the webpage to the crowd-sourcing server;
    receiving the manifest from the crowd-sourcing server;
    identifying the resources used for rendering the webpage on the first mobile computing device by comparing the manifest to information stored on the first mobile computing device; and
    assigning priorities to the identified resources in the first mobile computing device based on the manifest, and
    wherein the device processor is configured with processor-executable instructions such that receiving the resources used for rendering the webpage in the sequence determined based on the information for assigning priorities to the resources used for rendering the webpage in the manifest comprises:
        requesting the resources for rendering the webpage in the sequence based on priorities assigned by the first mobile computing device; and
        receiving the resources,
    wherein the server processor is configured with server processor-executable instructions to perform operations further comprising:
        receiving the information identifying the webpage;
        obtaining the manifest for the webpage; and
        transmitting the obtained manifest to the first mobile computing device.

60. The system of claim 59, wherein the device processor is configured with processor-executable instructions such that requesting the resources for rendering the webpage in the sequence based on priorities assigned by the first mobile computing device comprises requesting download of the resources from a web server in the sequence determined by the first mobile computing device based on the manifest.

61. The system of claim 57, wherein the device processor is configured with processor-executable instructions to perform operations further comprising transmitting information relating to the first mobile computing device to the crowd-sourcing server,
    wherein the device processor is configured with processor-executable instructions such that receiving the resources used for rendering the webpage in the sequence determined based the on the information for assigning priorities to the resources used for rendering the webpage in the manifest comprises:
        requesting the resources for rendering the webpage in the sequence based on priorities and appropriate object formats transmitted by the crowd-sourcing server; and
        receiving the resources, and
    wherein the server processor is configured with server processor-executable instructions to perform operations further comprising:
        receiving the information relating to the first mobile computing device;
        obtaining the manifest for the webpage;
        comparing the obtained manifest to the information relating to the first mobile computing device;
        identifying priorities and appropriate object formats for the resources used for rendering the webpage on the first mobile computing device; and
        transmitting to the first mobile computing device the identified priorities and appropriate object formats for the resources used for rendering the webpage on the first mobile computing device.

62. The system of claim 61, wherein the server processor is configured with server processor-executable instructions such that transmitting to the first mobile computing device the identified priorities and appropriate object formats for the resources used for rendering the webpage on the first mobile computing device comprises pushing the resources to the first mobile computing device in the sequence determined by the crowd-sourcing server based on the manifest.

63. The system of claim 62, wherein the server processor is configured with server processor-executable instructions to perform operations further comprising transcoding the resources to a desired format for the first mobile computing device.

64. The system of claim 57, wherein the meta information comprises one or more of information of a user agent, a list of object uniform resource locators, object dependency information, object type information, size information, and layout information.

* * * * *